United States Patent [19]

Sakai et al.

[11] Patent Number: 5,580,475

[45] Date of Patent: Dec. 3, 1996

[54] FLUX-CORED WIRE FOR GAS SHIELD ARC WELDING WITH LOW FUME

[75] Inventors: Yoshiya Sakai; Isao Aida, both of Fujisawa; Kazuo Ikemoto, Ibaraki; Tsuyoshi Kurokawa, Fujisawa; Shigeo Nagaoka, Fujisawa; Tetsuya Hashimoto, Fujisawa; Koichi Hosoi, Fujisawa, all of Japan

[73] Assignee: Kabushiki Kaisha Kobe Seiko Sho, Kobe, Japan

[21] Appl. No.: 271,939

[22] Filed: Jul. 8, 1994

[30] Foreign Application Priority Data

Aug. 12, 1993 [JP] Japan ................................ 5-220665
Mar. 31, 1994 [JP] Japan ................................ 6-086052

[51] Int. Cl.$^6$ ................................................. B23K 35/22
[52] U.S. Cl. ............................ 219/145.22; 219/146.22
[58] Field of Search ....................... 219/145.22, 146.22, 219/146.24, 146.3

[56] References Cited

U.S. PATENT DOCUMENTS 3,405,248 10/1968 Essers et al. .
4,571,480 2/1986 Sakai et al. .
4,999,478 3/1991 Bushey et al. .
5,233,160 8/1993 Gordish et al. .

FOREIGN PATENT DOCUMENTS 1045013 11/1958 Germany .
2136021 9/1984 United Kingdom .

OTHER PUBLICATIONS

Database WPI, Derwent Publications Ltd., AN 81–67195D, JP–A–56 095495, Aug. 1, 1981.
Database WPI, Derwent Publications Ltd., AN 73–61124U, SU–A–369 996, 1973.
Patent Abstracts of Japan, vol. 9, No. 282 (M–428) (2005), Nov. 9, 1985, JP–A–60 124493, Jul. 3, 1985.

Primary Examiner—Clifford C. Shaw
Attorney, Agent, or Firm—Oblon, Spivak, McClelland, Maier & Neustadt, P.C.

[57] ABSTRACT

Disclosed is a flux-cored wire for gas shield arc welding comprising a mild steel sheath and a flux composition filled in the mild steel sheath, wherein the mild steel sheath is made of a mild steel containing, based on the total weight of the sheath, 0.02% or less of C, 0.01 to 0.20% of Ti, and 0.01 to 0.15% of Al, the contents of Ti and C satisfying a relation of (Ti/C≧1.0) and the contents of Al and C satisfying a relation of (Al/C≧1.5); and the flux composition contains, based on the weight of the total wire, 0.50 to 3.60% of Mn (including the Mn amount in the sheath), and 0.10 to 1.80% of Si (including the Si amount in the sheath).

33 Claims, 13 Drawing Sheets

※ Cs AND Rb ARE ADDED FROM FLUX

FLUX-CORED WIRE FOR GAS SHIELD ARC WELDING WITH LOW FUME

BACKGROUND OF THE INVENTION

1. Field of the Invention

The present invention relates to a flux-cored wire for gas shield arc welding, and particularly to a flux-cored wire for gas shield arc welding capable of reducing the amount of fume generation, which is suitable for welding of mild steel, high tensile strength steel, low alloy steel and the like.

2. Description of the Related Art

Recently, there has been a problem in lack of man power in the whole industrial field. In particular, the industries of steel-frame work, machine-making, and shipbuilding have been seriously short of welders, and have developed techniques for enhancement of efficiency, automation and robotic process for welding, and also have made efforts to improve the hard, dirty and dangerous welding work environments.

Because of lack of welders, flux-cored wires for gas shield arc welding have increasingly required in terms of (1) easy welding, and (2) high efficiency welding. In particular, metal based flux-cored wires have a feature of lowering the amount of slag generation in addition to the above advantages (1) and (2), and are expected to be more widely used. However, the wires of this kind have a disadvantage in making the welding work environments poor resulting from generation of a large amount of welding fume.

Techniques of reducing welding fume have been disclosed, for example in Japanese Patent Publication Nos. 1403569, 1572313 and 1572327. In particular, it is well known that the reduction of the contents of carbon and oxygen in a sheath is effective to reduce welding fume. However, metal based flux-cored wires are used with a high current (for example, 300 to 500 A) to obtain a high deposition rate, to thus exponentially increase the amount of welding fume generation. This drawback cannot be solved by the conventional techniques.

On the other hand, titania based flux-cored wires have a feature being low in the amount of spatter generation and excellent in bead appearance, and further being easily used for welding in all positions, so that they have been widely used in the industries of shipbuilding, bridge construction, and machine-making. However, on the other hand, the lack of welders has become severe because of the harsh welding environments at high temperatures and with a large amount of welding fume.

SUMMARY OF THE INVENTION

An object of the present invention is to provide a flux-cored wire for gas shield arc welding which is capable of reducing the amount of fume generation.

Another object of the present invention is to provide a flux-cored wire for gas shield arc welding wherein the generation amount of fume can be reduced by improvement in a sheath composition.

A further object of the present invention is to provide a flux-cored wire for gas shield arc welding wherein the generation amount of fume can be reduced by improvement in compositions of a sheath and a flux.

A specific object of the present invention is to provide a metal based flux-cored wire for gas shield arc welding wherein the generation amount of fume can be reduced by improvement in a flux composition.

Another specific object of the present invention is to provide a metal based flux-cored wire for gas shield arc welding wherein the generation amount of fume can be reduced by improvement in compositions of a sheath and a flux.

A further specific object of the present invention is to provide a titania based flux-cored wire for gas shield arc welding wherein the amount of fume generation can be reduced by improvement in a flux composition.

Still a further specific object of the present invention is to provide a titania based flux-cored wire for gas shield arc welding wherein the amount of fume generation can be reduced by improvement in compositions of a sheath and a flux.

To reduce the amount of fume generation in a flux-cored wire for gas shield arc welding, the present inventors have examined the sheath composition, and found that the adjustment of contents of Ti and Al in a sheath is particularly effective in addition to the conventional technique of reducing the C content in the mild steel sheath; and at the same time, contents of Mn and Si in the flux are required to be adjusted for deoxidation, enhancement of strength and toughness of weld, and improvement of bead shape.

On the basis of this knowledge, according to the present invention, there is provided a flux-cored wire for gas shield arc welding including a mild steel sheath and a flux composition filled in the mild steel sheath, wherein the mild steel sheath contains, based on the weight of the total sheath, 0.02% or less of C, 0.01 to 0.20% of Ti, and 0.01 to 0.15% of Al, the contents of Ti and C satisfying a relation of (Ti/C≧1.0) and the contents of Al and C satisfying a relation of (Al/C≧1.5); and the flux composition contains, based on the weight of the total wire, 0.50 to 3.60% of Mn (including the Mn amount in the sheath), and 0.10 to 1.80% of Si (including the Si amount in the sheath).

On the other hand, to reduce the amount of fume generation in a flux-cored wire for gas shield arc welding, the present inventors have examined a method of reducing fume in terms of the flux composition, and found that in either of a metal based flux or a titania based flux, the amount of fume generation can be reduced by suitably adding one or two kinds of Cs and Rb in the flux.

On the basis of this knowledge, according to the present invention, there is provided a metal based flux-cored wire for gas shield arc welding including a mild steel sheath and a flux composition filled in the mild steel sheath, wherein the flux composition is filled in the mild steel sheath in an amount of 10 to 30% (based on the weight of the total wire); and the flux composition contains, based on the weight of the total flux, 60 to 85% of Fe powder, 0.5% or less of C, 0.5 to 3.0% of Ti, and 0.01 to 0.3% (Cs and/or Rb converted value) of the total of one or two kinds of compounds of Cs and/or Rb, the contents of C, Cs, Rb and Ti satisfying a relation of {C/(Cs+Rb)}+Ti=3 or more (the contents of Cs and/or Rb are converted from those in the compounds of Cs and/or Rb (% based on the weight of the total flux)).

Moreover, according to the present invention, there is provided a titania based flux-cored wire for gas shield arc welding including a mild steel sheath and a flux composition filled in the mild steel sheath, wherein the flux composition is filled in the mild steel sheath in an amount of 5 to 30% (based on the weight of the total wire); and the flux composition contains, based on the weight of the total flux, 8 to 60% of $TiO_2$, 0.01 to 1.0% of Cs compounds (Cs converted value) and 0.5% or less of C, the ratio between the $TiO_2$/compounds of Cs (Cs converted value) being in the range of from 20 to 2000.

Additionally, the present inventors have found that the amount of fume generation can be extremely reduced by the addition of one or two kinds of Cs and Rb in a metal based or titania based flux, in combination with the reduction in the C content and the adjustment of the contents of Ti and Al in the mild steel sheath described above.

On the basis of this knowledge, according to the present invention, there is provided a metal based flux-cored wire for gas shield arc welding including a mild steel sheath and a flux composition filled in the mild steel sheath, wherein the mild steel sheath contains, based on the total weight of the sheath, 0.02% or less of C, 0.01 to 0.20% of Ti, and 0.01 to 0.10% of Al, the contents of Ti and C satisfying a relation of (Ti/C≧1.0) and the contents of Al and C satisfying a relation of (Al/C≧1.5); and the flux composition contains, based on the weight of the total wire, 0.01 to 0.30% (alkali metal converted value) of one or more kinds of oxides and fluorides of alkali metals excluding Cs and Rb, 5 to 28% of Fe powder, 94% or more (based on the weight of the total flux) of metal powder, and 0.001 to 0.10% of the total of one or two kinds of Cs and Rb, and further 0.50 to 3.60% of Mn (including the Mn amount in the sheath) and 0.10 to 1.80% of Si (including the Si content in the sheath).

Moreover, according to the present invention, there is provided a titania based flux-cored wire for gas shield arc welding including a mild steel sheath and a flux composition filled in the mild steel sheath, wherein the mild steel sheath contains, based on the weight of the total sheath, 0.02% or less of C, 0.01 to 0.20% of Ti, and 0.01 to 0.15% of Al, the contents of Ti and C satisfying a relation of (Ti/C≧1.0) and the contents of Al and C satisfying a relation of (Al≧1.5); and the flux composition contains, based on the weight of the total wire, 1.00 to 8.50% of $TiO_2$, 0.01 to 1.50% (alkali metal converted value) of oxides of alkali metals excluding Cs, 0.0005 to 0.3% (Cs converted value) of compounds of Cs, the ratio between $TiO_2$/compounds of Cs (Cs converted value) being in the range of from 20 to 2000, and 0.06% or less of C, and further 0.50 to 3.60% of Mn (including the Mn amount in the sheath) and 0.10 to 1.50% of Si (including the Si amount in the sheath).

DETAILED DESCRIPTION OF THE PREFERRED EMBODIMENTS (1) Reduction of fume mainly by adjustment of sheath composition The reduction of fume mainly by adjustment of a mild steel sheath composition according to the present invention will be described in detail.

First, various experiments have been made to reduce welding fume in terms of the sheath composition, which gave the results shown as follows.

In these experiments, flux-cored wires (diameter: 1.4 mm) were fabricated using a metal based flux composition (flux ratio: 15%) shown by No. 1 in Table 2 described later in combination with mild steel sheaths (C: 0.003–0.03%, Mn: 0.20–0.30%, Si: 0.01–0.03%, P: 0.008–0.011%, S: 0.005–0.007%, N: 0.002–0.004%, and Ti and Al: variable).

Figure 3:
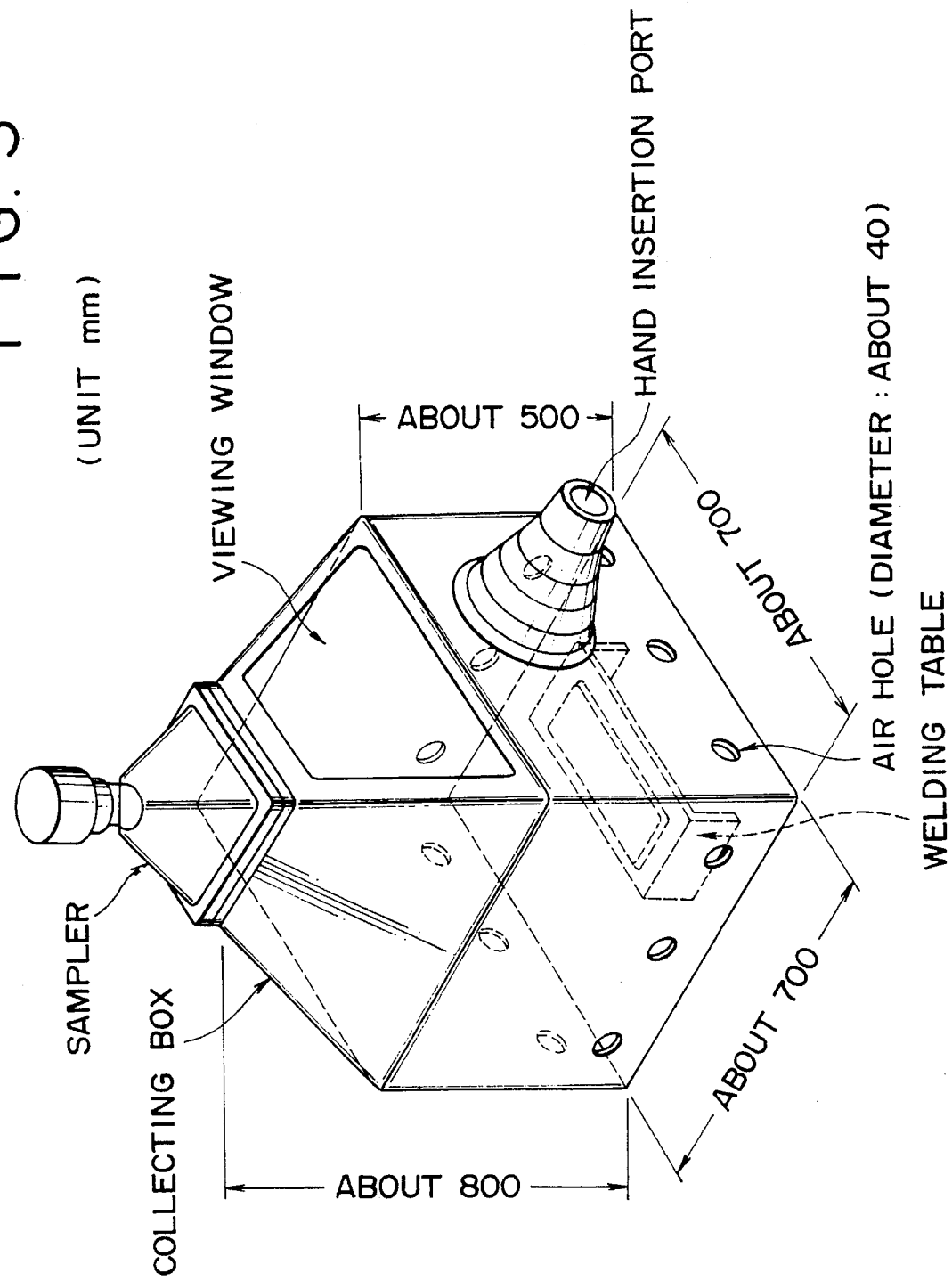
FIG. 3 shows an apparatus provided with a fume collecting box.

The wires thus obtained were used for performing a downward bead-on plate welding test using a test plate (JIS G3106 SM490A, thickness: 12 mm) under the following welding conditions. The amount of welding fume generated in the above test was measured according to JIS Z3930, using a fume collecting box shown in FIG. 3.

(Welding Conditions)
Welding current: 350 A
Welding voltage: 36 V
Welding rate: 30 cm/min
Wire extension: 25 mm
Polarity: DCEP (wire: plus)
Shield gas: $CO_2$ (flow rate: 25 l/min)

Figure 1:
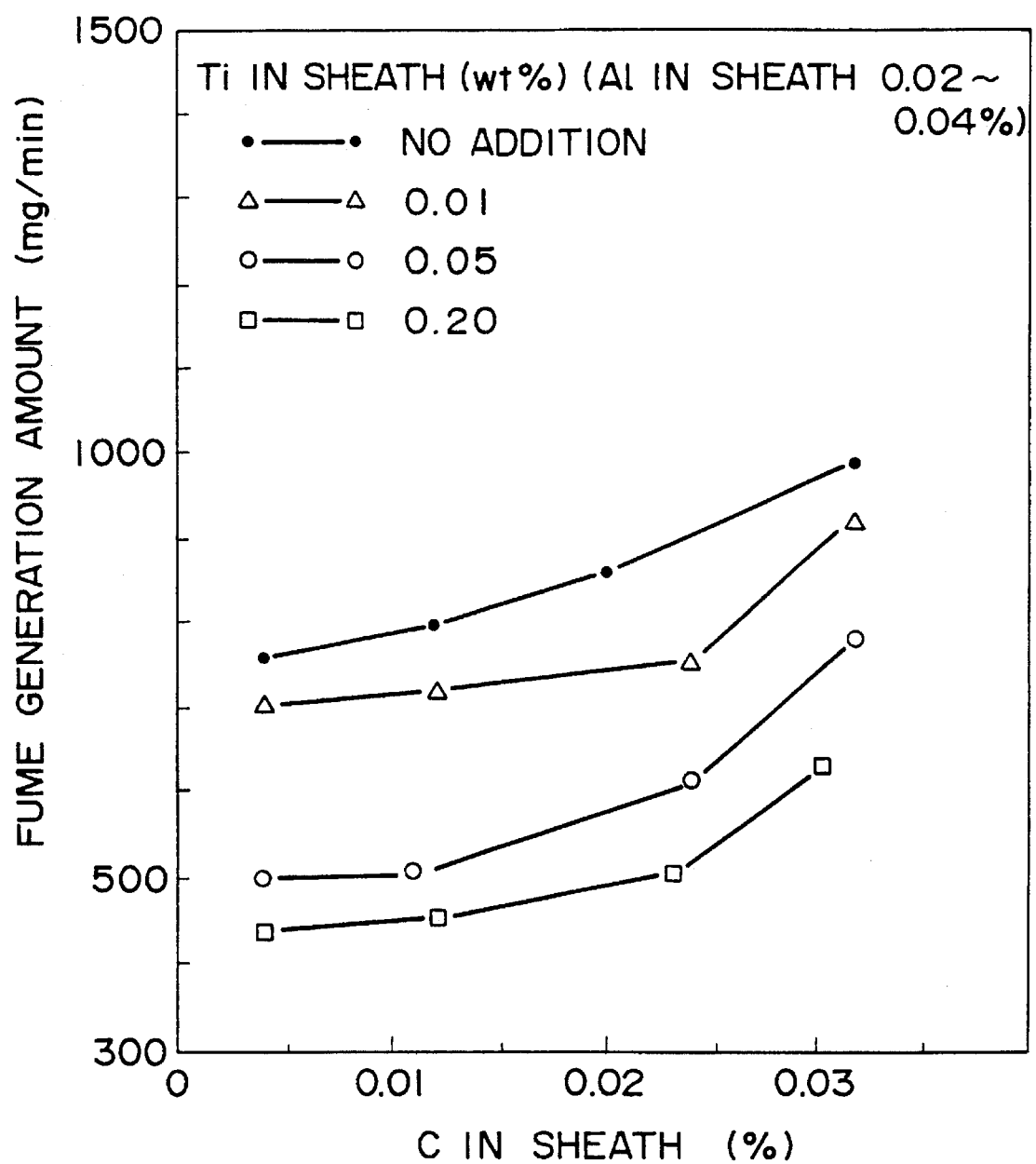
FIG. 1 is a graph showing a relationship between the amount of fume generation and the contents of C, Ti and Al in a mild steel sheath.
Figure 2:
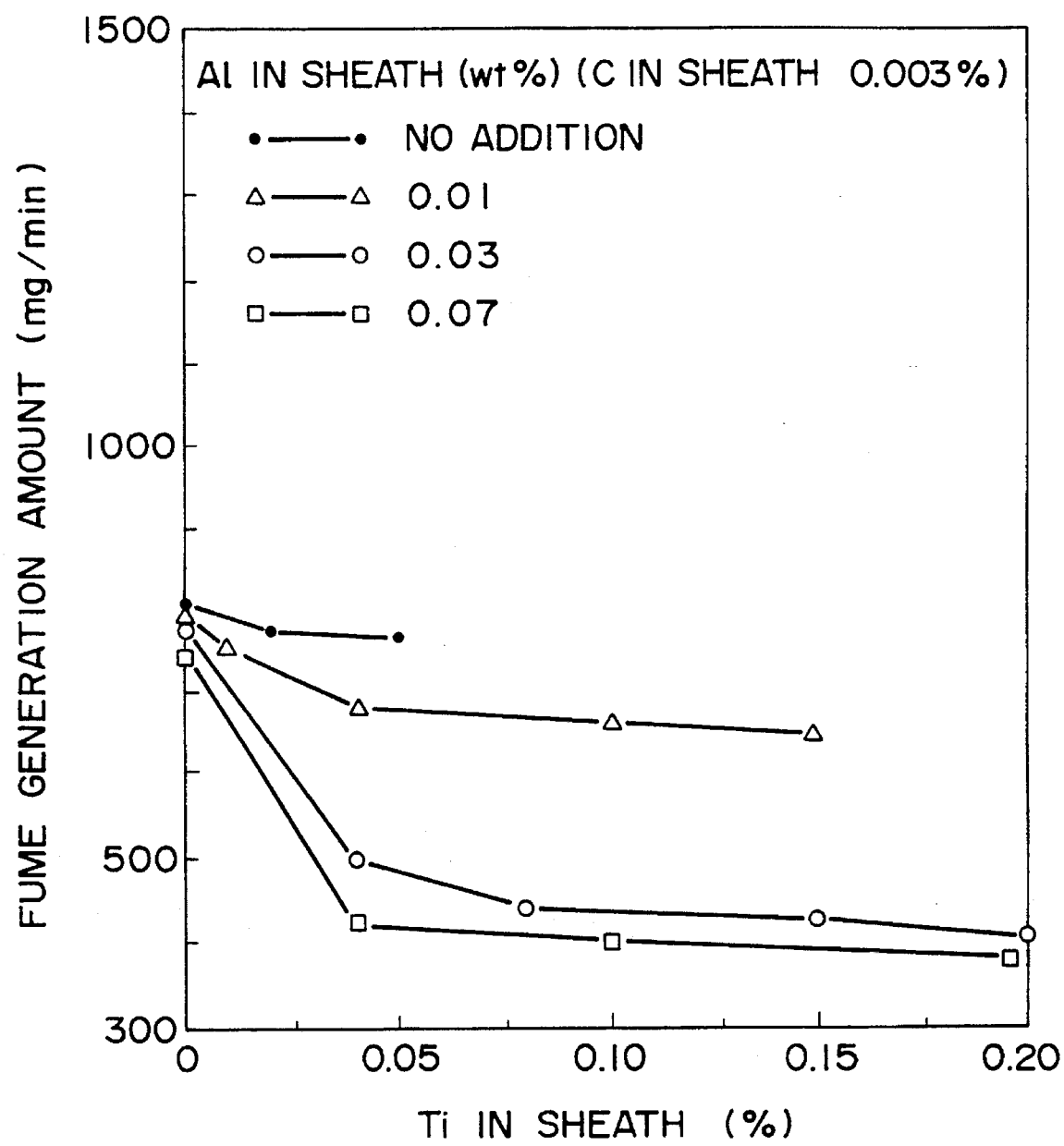
FIG. 2 is a graph showing a relationship between the amount of fume generation and the contents of Ti, C and Al in a mild steel sheath.

FIGS. 1 and 2 show relationships between the amount of welding fume generation and the contents of Ti, Al and C in a mild steel sheath, which are obtained on the basis of the above experiments. As will be apparent from FIGS. 1 and 2, the complex addition of Ti and Al in respective amounts of 0.01% or more in the mild steel sheath is effective to reduce the amount of fume generation, in addition to the reduction of the C content according to the conventional technique. Moreover, the single addition of Al is not effective; but the complex addition of Al and Ti is significantly effective. Additionally, to effectively reduce the amount of welding fume generation, the contents of Ti and Al are specified to be under the conditions that C≦0.02%, Ti/C≧1.0%, Al/C≧1.5%.

The reason why the addition of Ti and Al is effective to reduce the amount of welding fume generation is that Ti and Al have high affinity with oxygen and generate oxides having high solidifying points, to form an oxide film on the surface of hanging droplet at the tip of a wire during arc welding, thus suppressing the explosive generation of CO and $CO_2$, which are regarded as the source of fume generation, caused by the reaction between oxygen and carbon.

Moreover, it was revealed that the upper limits of Ti and Al must be in a relation of (Ti≦0.20% and Al≦0.15%) for avoiding the material deterioration such as reduction in ductility and hardening which are caused by their high yields in weld.

For this reason, a mild steel sheath suitable for reduction in welding fume contains, based on the total weight of the sheath, 0.02% or less of C, 0.01 to 0.20% of Ti, and 0.01 to 0.15% of Al, the contents of Ti and C satisfying a relation of (Ti/C≧1.0) and the contents of Al and C satisfying a relation of (Al≧1.5).

Preferably, the above mild steel sheath contains 0.01% or less of C, 0.01 to 0.10% of Ti, and 0.01 to 0.05% of Al, the contents of Ti and C satisfying a relation of (Ti/C≧3.0) and the contents of Al and C satisfying a relation of (Al/C≧2.0).

In addition, under the consideration of the workability in the rolling and/or drawing processes for wire fabrication, preferably, the content of Mn is in the range of from 0.10 to 0.70% and the content of Si is in the range of 0.35% or less.

A flux composition filled in the above mild steel sheath may be constituted of any type of composition so long as the Mn content (including the Mn content in the sheath) is in the range of from 0.50 to 3.60%, and the Si content is in the range of from 0.10 to 1.80%.

Here, Mn is added in the flux under the consideration of the Mn content in the mild steel sheath, to act as a deoxidizing agent, to improve toughness by enhancement of strength and hardenability, and to improve bead shape (especially, for horizontal fillet welding) due to an increase in viscosity of molten metal slag. In this case, when the Mn content is less than 0.5%, it is difficult to obtain the sufficient strength for a mild steel and to obtain a good bead shape. Meanwhile, over 3.6%, the strength of weld is excessively increased, tending to cause low temperature cracking. Accordingly, the Mn content is specified to be in the range of from 0.50 to 3.6%. The sources of Mn include Mn, Fe-Mn, Fe-Si-Mn and the like.

Si has the same effect as that of Mn. When the Si content is less than 0.1%, the effects to act as a deoxidizing agent, to improve toughness, and to improve bead shape cannot be obtained. Meanwhile, when being more than 1.8%, the yield of Si in weld is excessively increased, to rather lower toughness and ductility. Accordingly, the Si content is specified to be in the range of from 0.10 to 1.8%. The sources of Si include Si, Fe-Si, Fe-Si-Mn, Fe-Si-Mg and the like.

More preferably, the flux composition contains, based on the weight of the total wire, 0.005 to 0.3% (Cs and/or Rb converted value) of one or two kinds of compounds of Cs and/or Rb, in addition to the above Mn and Si.

For example, preferably, a metal based flux composition contains, based on the weight of the total wire, 0.03 to 1.0% of Ti or Ti oxide (Ti converted value), 0.01 to 0.15% of one or more kinds of oxides or fluorides of alkali metals (alkali metal converted value), 5 to 28% of Fe powder, and 94% or more (based on the weight of the total flux) of a metal powder, and further, 0.50 to 3.60% of Mn (including the Mn amount in the sheath) and 0.10 to 1.80% of Si (including the Si amount in the sheath).

More preferably, the above flux composition contains, based on the weight of the total wire, 1.0% or less of Al or $Al_2O_3$ (Al converted value).

Moreover, the flux composition preferably contains, based on the weight of the total wire, 0.07% or less of C wherein the contents of Ti and C satisfy a relation of Ti/C≧1.0).

Additionally, in the above flux composition, the contents of Ti and C preferably satisfy a relation of Ti/C≧3.0).

In the above metal based flux, Ti is effective to reduce welding fume, to improve penetration shape, and to improve arc stability, and is added in a flux under the consideration of the Ti content in a mild steel sheath. Namely, the Ti content in an amount of 0.03% or more is effective to reduce welding fume, and to improve penetration depth and arc stability. However, when being more than 1.0%, Ti in the form of metal or alloy is greatly transferred in weld, to extremely reduce ductility; and Ti oxide excessively generates slag, tending to cause slag inclusion upon continuous multi-layer welding.

Alkali metals such as Li, Na, K, Rb and Cs are added to lower arc stability and to reduce spatter generation. Alkali metals have high hygroscopicity; accordingly, they are desirable to be added by one or more kinds in the form of oxides or fluorides. The reason why the contents of alkali metals are specified in the above range is as follows. When the contents of alkali metals are less than 0.01%, the effects to improve arc stability and to reduce the amount of spatter generation cannot be obtained. Meanwhile, over 0.15%, the amount of spatter generation is rather increased and the effect of reducing welding fume by the addition of Ti and Al cannot be obtained, because alkali metals are high in vapor pressure.

In addition, feldspar, sodium silicate anhydride, water glass, complex oxides of Li, Na, K and the like, cryolite, fluorides such as potassium silicofluoride, sodium silicofluoride, and carbonates of alkali metals in small amounts are similarly effective because they are dissolved by welding arc into oxides.

Fe powder is added according to a flux ratio to obtain a high deposition rate. When the flux ratio (% based on the weight of the total wire) is less than 10%, spatter of large grain is increased because the wall thickness of the sheath is excessively thick. Meanwhile, over 30%, the wire is softened along with the reduction in the wall thickness of the sheath, with a result of the reduction of feedability, and further arc is significantly expanded, tending to reduce penetration depth and to generate undercut. Accordingly, the flux ratio is preferably in the range of from 10 to 30%.

Fe powder is added according to the above flux ratio; however, less than 5%, it is difficult to obtain a high deposition rate which is regarded as the feature of the metal based flux-cored wire. Meanwhile, over 28%, the other components such as a deoxidizing agent are insufficient, which makes it difficult to secure the specified mechanical properties of weld and prevent weld defects such as pit and blowhole. Accordingly, Fe powder is specified to be in the range of from 5 to 28%.

To secure a high deposition rate as the feature of the metal based flux-cored wire, and to secure a slag amount sufficient for continuous multi-layer welding, the metal powder ratio in the flux excluding non-metals such as oxides, fluorides and carbonates must be in the range of 94% or more.

Al is effective to reduce the generation amount of welding fume, although being smaller in its effect than Ti, and is added if needed. In this case, over 1.0%, the addition of Al in the form of metal or alloy excessively increases the yield of Ti into weld, significantly reducing ductility; and the addition of Al in the form of $Al_2O_3$ significantly reduces slag removability. The sources of Al include Al, Al alloys such as Fe-Al and Al-Li, and oxides such as $Al_2O_3$.

C may be suitably added in the flux under consideration of the C content in the mild steel sheath if needed, to act as a deoxidizing agent, to secure strength and toughness by improvement of hardenability, and to obtain penetration depth. In the case, when the C content is more than 0.07%, the effect of reducing the amount of fume generation by the addition of Ti and Al cannot be obtained, to significantly increase the amount of welding fume generation. Accordingly, the C content is in the range of 0.07% or less. The sources of C include Fe-Mn, Fe-Si-Mn, graphite, Fe powder (carbon steel, cast iron) and carbonate.

To reduce the amount of welding fume generation in terms of the flux composition, it is effective to reduce the C content in the flux and simultaneously add Ti according to the C content. Namely, the Ti/C ratio adjusted to be 1.0 or more gives the significant effect to reduce welding fume. In addition, the sources of Ti includes metal Ti, alloys such as Fe-Ti, rutile, reduced ilmenite, leucoxene, ilmenite, and oxides such as potassium titanate.

Moreover, within the range of satisfying the above ratio of metal powder, oxides such as $SiO_2$, $ZrO_2$, CaO and FeO may be added to further improve bead appearance/shape; and bismuth oxide ($Bi_2O_3$) specified to be in an amount of 0.1% or less (based on the weight of the total wire) not to generate high temperature cracking may be added to improve slag removability, and MgO or Mg in an amount of 0.2% (based on the weight of the total wire) not to deteriorate bead shape may be added to improve slag removability.

Next, a titania based flux composition preferably contains, based on the weight of the total wire, 1.00 to 8.50% of $TiO_2$, and 0.01 to 1.50% of oxides of alkali metals (alkali metal converted value); and further 0.50 to 3.60% of Mn (including the Mn amount in the sheath) and 0.10 to 1.50% of Si (including the Si amount in the sheath).

More preferably, the above flux composition contains, based on the weight of the total wire, 0.01 to 1.00% of Mg and/or MgO (Mg converted value).

Alternatively, the above flux composition contains, based on the weight of the total wire, 0.06% or less of C.

In the above titania based flux, $TiO_2$ is expected to act as a slag removing agent or an arc stabilizer. The $TiO_2$ content is required to be added in an amount of at least 1.00% or more to improve bead appearance/shape and arc stability in downward or horizontal welding. However, when the $TiO_2$ content is more than 8.50%, the solidifying point of slag is made higher, and the viscosity thereof is excessively increased, tending to generate slag inclusion and blowhole on the surface of bead. The sources of $TiO_2$ include rutile, reduced ilmenite, leucoxene, ilmenite, and oxides such as potassium titanate.

The addition of alkali metals such as Li, Na, K, Rb and Cs is effective to enhance arc stability and to reduce the amount of spatter; however, they act as sources of significantly generating welding fume. In particular, fluorides and carbonate of alkali metals and simple oxides such as $Na_2O$, $K_2O$ and $Li_2O$ become the sources of significantly generating welding fume. However, the present inventors have found the fact that the addition of the alkali metals such as Li, Na, K, Rb and Cs in the form of complex oxides combined with one kind or more kinds of $Ti_xO_y$, $Al_xO_y$, $Fe_xO_y$, $Mn_xO_y$, $Si_xO_y$ and $Zr_xO_y$ (x, y: positive number), suppresses the increase in the amount of welding fume generation, and rather reduces the amount of fume generation in the cases of Cs and Rb. The reason why the added amount of oxides of alkali metals is specified in the above range is as follows. When being less than 0.01%, the effects to improve arc stability and to reduce the amount of spatter generation cannot be obtained. Meanwhile, over 1.50%, the fume reducing effect by the limitation of the sheath composition is little expected except for Rb and Cs, and also slag removability is significantly reduced. Each of oxides of alkali metals is added in an amount to be converted in an alkali metal. The examples of the complex oxides includes $LiFeO_2$, $Li_2SiO_3$, $Li_2MnO_3$, $Li_2ZrO_3$, $Li_2TiO_3$, $Na_2SiO_3$, $NaAlSi_3O_3$, $K_2TiO_3$, $KAlSi_3O_3$ and $CsAlSi_2O_6$. These complex oxides are fabricated by a high temperature baking or melting method, or obtained using natural materials such as feldspar.

An Al containing sheath is used for reducing welding fume, and compounds of alkali metals are incorporated in the flux for improving arc stability; however, these tend to deteriorate slag removability in the cases of narrow groove angle and of a large welding thermal input. To improve slag removability, Mg and/or MgO are added, if needed. The reason why the added amount of Mg and/or MgO is specified in the above range is that, when being less than 0.01%, the effect to improve slag removability can be obtained; and over 1.00%, the amount of welding fume generation is increased. Moreover, Mg and MgO act to reduce oxygen in weld and are effective to improve toughness and blowhole resistance. The sources of Mg include metal Mg, alloys such as Al-Mg, Li-Mg, Ni-Mg, and Si-Mg; and the sources of MgO include clinker, magnesium silicate and olivin sand.

C is added in the flux under consideration of the C content in the sheath, if needed, to act as a deoxidizing agent, to adjust strength, secure toughness due to enhancement of hardenability, and to obtain a suitable penetration depth due to acceleration of arc concentration. In this case, when the C content is more than 0.06%, the effect of reducing welding fume by the addition of Ti and Al in the sheath cannot be obtained, to significantly increase the amount of welding fume generation, and to increase the amount of spatter generation.

In addition, under the consideration of bead appearance/shape, usability characteristics and mechanical properties of weld, the following components may be added in the flux and/or the sheath, based on the weight of the total wire.

The addition of $SiO_2$ in an amount of 0.1% or more is effective to improve usability characteristics such as bead appearance/shape and slag removability; however, over 1.5%, the acidity and viscosity of slag are excessively increased, to reduce cleanliness of weld and to easily generate slag inclusion and blowholes.

$ZrO_2$ acts to increase the solidifying point of slag. The addition of $ZrO_2$ in an amount of 0.05% or more is effective to improve bead shape in fillet welding, especially horizontal fillet welding; however, over 0.6%, slag removability and bead appearance are deteriorated.

$Al_2O_3$ acts to increase the solidifying point and viscosity of slag and hence to improve bead shape in vertical upward welding and overhead welding. To obtain the above effect, $Al_2O_3$ must be added in an amount of 0.05% or more. However, over 1.0%, the viscosity of slag is excessively increased, to deteriorate bead appearance/shape and workability in vertical downward welding, and to significantly cause the burning of slag.

Al, which is added both in the sheath and flux, acts as a deoxidizing agent and a nitrogen fixing agent, and further has the same effect as that of $Al_2O_3$. The addition range and the limitation reason of Al are the same as those of $Al_2O_3$.

Fluorides of alkali metals such as Na, K, Li and alkali earth metals such as Ca and Sr act to reduce the amount of hydrogen of weld. To obtain the above effect, metal fluorides must be added in an amount of 0.01% or more; however, over 0.2%, the amount of fume generation is significantly increased and the viscosity of molten slag is lowered, to significantly deteriorate bead shape in upward welding and horizontal welding.

Bismuth oxide ($Bi_2O_3$) presents at the interface between weld and slag, to significantly improve slag removability. To achieve the above effect, $Bi_2O_3$ is added in an amount of 0.005% or more; however, over 0.05%, high temperature cracking is easily generated.

Moreover, as is well known, the addition of Ti and B having the grain refining function in the sheath metal, other than C, Mn and Si, is effective to improve notch toughness of weld. Similarly, the following components are added in the metal sheath and/or flux based on the weight of the total wire, if needed.

Ti is added in the flux in the form of $TiO_2$ and in the metal sheath; however, to increase the deoxidizing effect and the grain refining effect, Ti may be further added in the flux in an amount of 0.7% or less. When being more than 0.7%, the yield of Ti in weld is enhanced, to excessively increase the strength of weld and reduce the toughness thereof.

B is added together with Ti and $TiO_2$ to refine grains of weld, thus significantly increasing the toughness. B is added in the metal sheath and flux (in the form of an alloy such as Fe-B or $B_2O_3$) in an amount of 0.002% to achieve the above effect; however, over 0.025%, the yield of B in weld is enhanced, to harden the weld, rather reducing toughness, and to make sensitive the weld to high temperature cracking.

Ni is an element of strengthening the matrix of crystal structure of weld, and improving toughness by hardening; however, over 4.0%, it acts to significantly accelerate hardenability of weld and to significantly reduce cracking resistance.

Moreover, the flux-cored wire may contain Ni, Cu and Cr when used for weather resisting steel, and contain Ni, Cr and Mo when used for heat resisting steel in the flux or the metal sheath while being matched to the base material components.

In addition, the flux ratio (flux weight/total wire weight) in the wire is preferably in the range of from 5 to 30%. In general, the flux ratio is determined in combination with the wire sectional shape in viewpoint of the uniformity in fusion of wire and workability of wire. Namely, for a small diameter wire, a low flux ratio and a single section are desirable; and for a large diameter wire, a high flux ratio and a complex section are desirable.

(2) Reduction of fume mainly by adjustment of flux composition (metal base)

Next, the reduction of fume mainly by adjustment of a metal based flux composition according to the present invention will be described.

First, various experiments have been made to reduce welding fume in terms of flux composition, which gave the result shown as follows.

In these experiments, flux-cored wires (diameter: 1.4 mm) were fabricated using metal based flux compositions (flux ratio: 15%) in which the contents of C, Ti, Cs and Rb were variable, in combination with a mild steel sheath.

The wires thus obtained were used for performing a downward bead-on plate welding test using a test plate (JIS G3106 SM490A, thickness: 12 mm) under the following welding conditions. The amount of welding fume generated in the above test was measured according to JIS Z3930, using a fume collecting box shown in FIG. 3.

Figure 4:
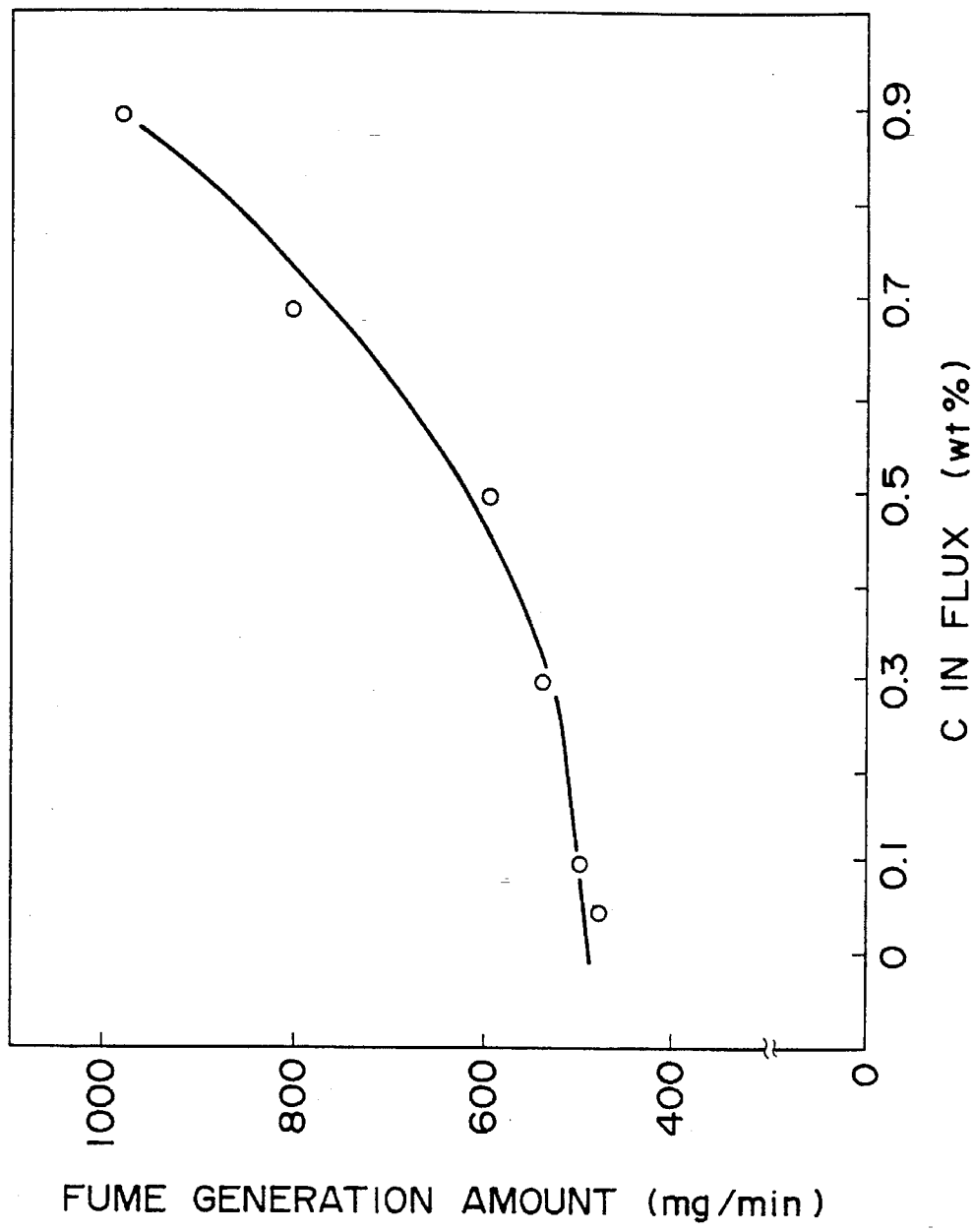
FIG. 4 is a graph showing a relationship between the amount of fume generation and the C content in a metal based flux.
Figure 5:
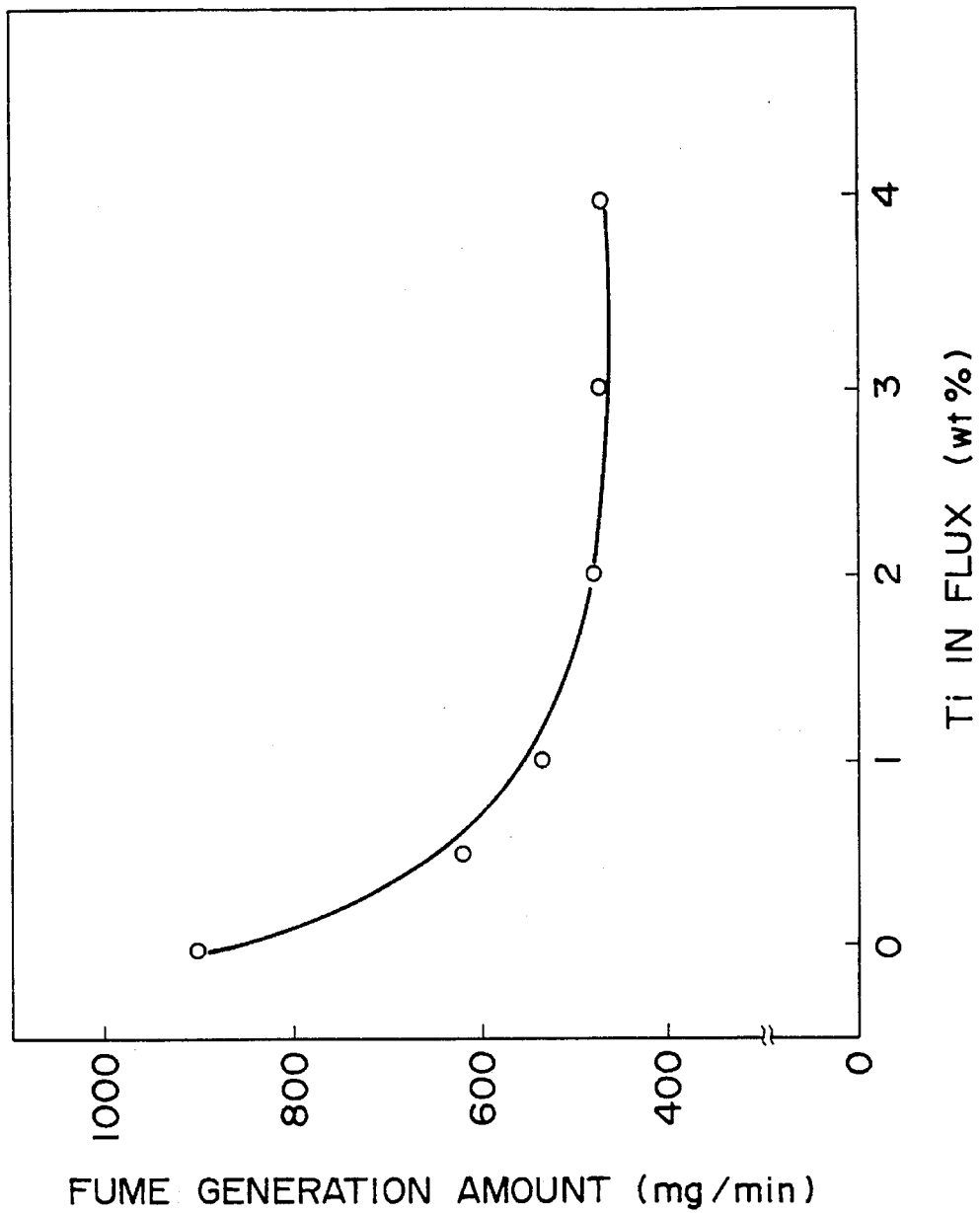
FIG. 5 is a graph showing a relationship between the amount of fume generation and the Ti content in a metal based flux.
Figure 6:
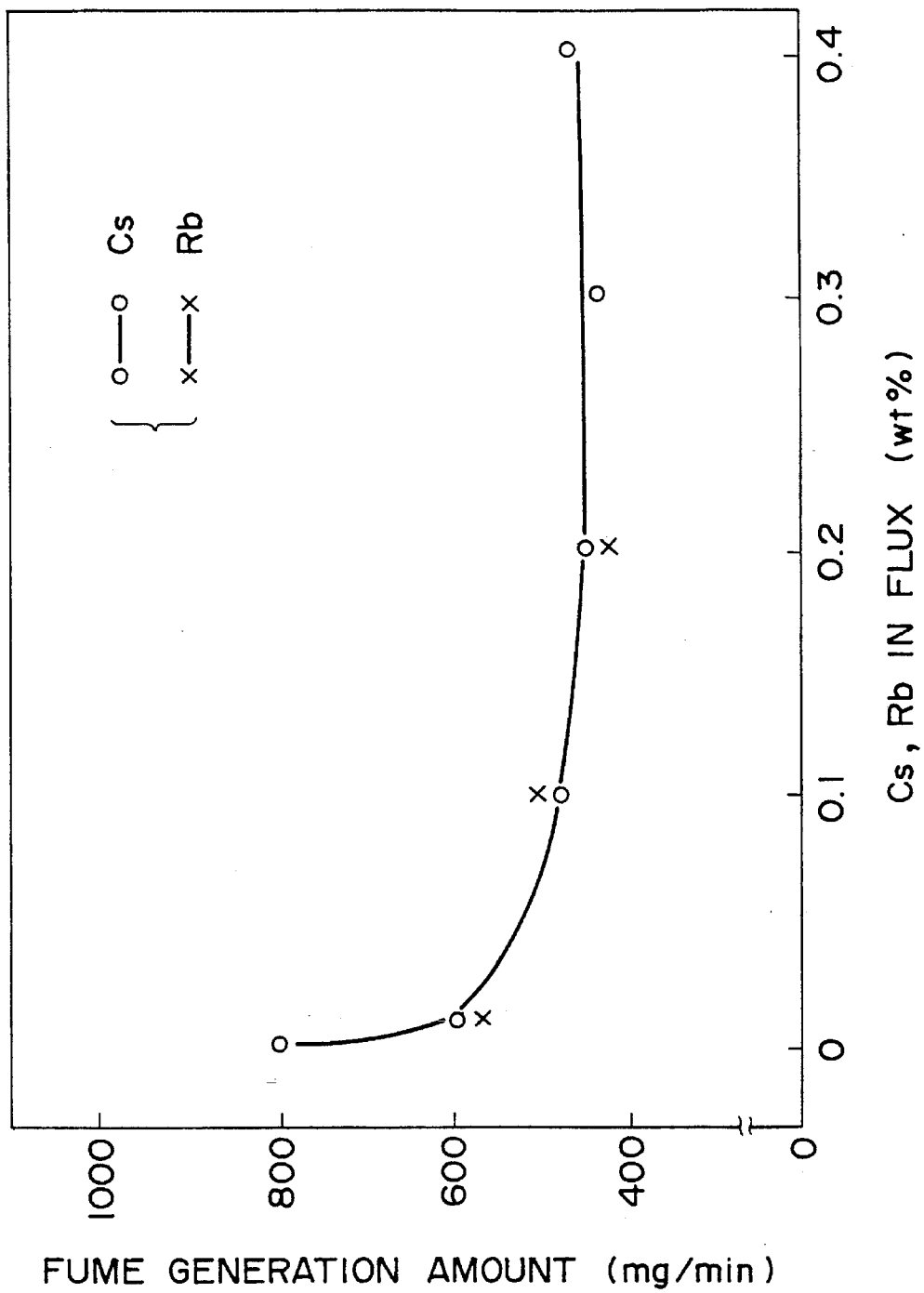
FIG. 6 is a graph showing a relationship between the amount of fume generation and the contents of Cs and Rb in a metal based flux.

(Welding conditions)
Welding current: 350 A
Welding voltage: suitable (arc extension: 1.5 mm from the surface of base material)
Welding rate: 30 cm/min
Polarity: DCEP (wire: plus)
Distance between tip and base metal: 25 mm The test results are shown in FIGS. 4, 5 and 6. As will be apparent from these figures, ①the content of C, ②the content of Ti, and ③the contents of Cs and/or Rb are important to reduce the amount of fume generation of the metal based flux-cored wire.

Accordingly, it is revealed that, to reduce the amount of fume generation of the metal based flux-cored wire, the essential requirements lie in (1) the reduction of the C content, (2) the increase in the Ti content, and (3) the addition of the contents of Cs and/or Rb. If a wire does not satisfy either of the above requirements, it cannot achieve the effect of reducing the amount of fume generation. Namely, by satisfying all of the above three requirements, it is possible to achieve the good effect of reducing the generation amount of fume generation.

On the basis of the above experimental results, according to the present invention, in a metal based flux-cored wire for achieving the reduction of fume, a flux composition is filled in the mild steel sheath in an amount of 10 to 30% based on the weight of the total wire; and the flux composition contains, based on the weight of the total flux, 60 to 85% of Fe powder, 0.5% or less of C, 0.5 to 3.0% of Ti, and 0.01 to 0.3% (Cs and/or Rb converted value) of the total of one or two kinds of compounds of Cs and/or Rb, the contents of C, Cs, Rb and Ti satisfying a relation of $\{C/(Cs+Rb)\}+Ti=3$ or more (the contents of Cs and/or Rb are converted from those in the compounds of Cs and/or Rb (% based on the weight of the total flux).

Here, when the content of Fe powder is less than 60%, the efficiency, which is a feature of the metal based flux-cored wire, is reduced; however, over 85%, the other components (deoxidizing agent, etc.) are insufficient, tending to generate weld defects such as pit and blowhole, which makes it difficult to secure good weld.

When the C content is more than 0.5%, the amount of welding fume generation is increased (see FIG. 4), and the amount of spatter generation is also increased. Accordingly, the C content is limited to be 0.5% or less.

When the Ti content is less than 0.5%, the effect of reducing the amount of fume generation cannot be obtained (see FIG. 5); however, over 3.0%, the amount of slag generation is increased, which is undesirable in terms of toughness and cracking resistance of weld. In addition, Ti may be added in the form of ferro-alloys and oxides, other than Ti metal.

When the total amount of one or two or more kinds of Cs and Rb is less than 0.01%, the effect of reducing the amount of fume generation cannot be obtained (see FIG. 6); however, over 0.3%, hygroscopic resistance is deteriorated, to reduce blowhole resistance and increase the generation amount of diffusive hydrogen of weld, thereby deteriorating cracking resistance. In addition, Cs and Rb may be added in the suitable form, and particularly, Cs may be added in the form of $CsCO_3$ or complex oxides with $TiO_2$ and $SiO_2$.

However, the relationship between the ratio of C to (Cs+Rb) and Ti is limited in viewpoint of weld defects. Namely, when the total amount of $[\{C/(Cs+Rb)\}+Ti]$ is less than 3, the penetration depth is made small, tending to generate weld defects such as incomplete penetration and incomplete fusion in groove welding. Accordingly, the total amount of [{C/(Cs+Rb)}+Ti] must be in the range of 3 or more. In the equation of [{C/(Cs+Rb)}+Ti], the first term is dimensionless and the second term is expressed by %; however, the total of the respective values is specified to be 3 or more.

When the flux ratio (% based on the weight of the total wire) is less than 10%, spatter of large grain is increased. Meanwhile, over 30%, the wire is softened along with an decrease in the thickness of the sheath, which reduces the feedability of the wire and tends to generate weld defects such as undercut due to arc instability. Accordingly, the flux ratio is in the range of from 10 to 30%.

In addition, the other components, which are commonly added in the metal based flux-cored wire, may be of course added in this flux.

The sheath is made of a common mild steel material, preferably, is made of a mild steel containing 0.01 or less of C and 0.01 to 0.20% of Ti for reducing the welding fume.

The mild steel sheath further effective to reduce welding fume is made of a mild steel containing 0.01% or less of C, 0.01 to 0.10% of Ti, and 0.01 to 0.05% of Al, the contents of Ti and C satisfying a relation of (Ti/C≧3.0) and the contents of Al and C satisfying a relation of (Al/C≧2.0).

(3) Reduction of fume mainly by adjustment of flux composition (titania base)

Next, the reduction of fume mainly by adjustment of a titania based flux composition according to the present invention will be described.

First, various experiments have been made to reduce welding fume in terms of flux composition, which gave the result shown as follows.

In these experiments, flux-cored wires (1.2 mm) were fabricated using various titania based flux compositions in combination with a mild steel sheath. The wires thus obtained were tested under the following welding conditions for examining the effect of reducing welding fume according to JIS Z3930.

(Welding conditions)
Welding process: downward bead-on plate welding
Welding current: 300 A
Arc voltage: suitable voltage to obtain arc extension of 1.5 to 2.0 mm)
Welding rate: 30 cm/min
Wire extension: 25 mm
Polarity: DCEP (wire: plus)
Shield gas: 100% $CO_2$ (flow rate: 25 l/min)
Test plate: JIS G3106 SM490A (thickness: 12 mm)

Figure 7:
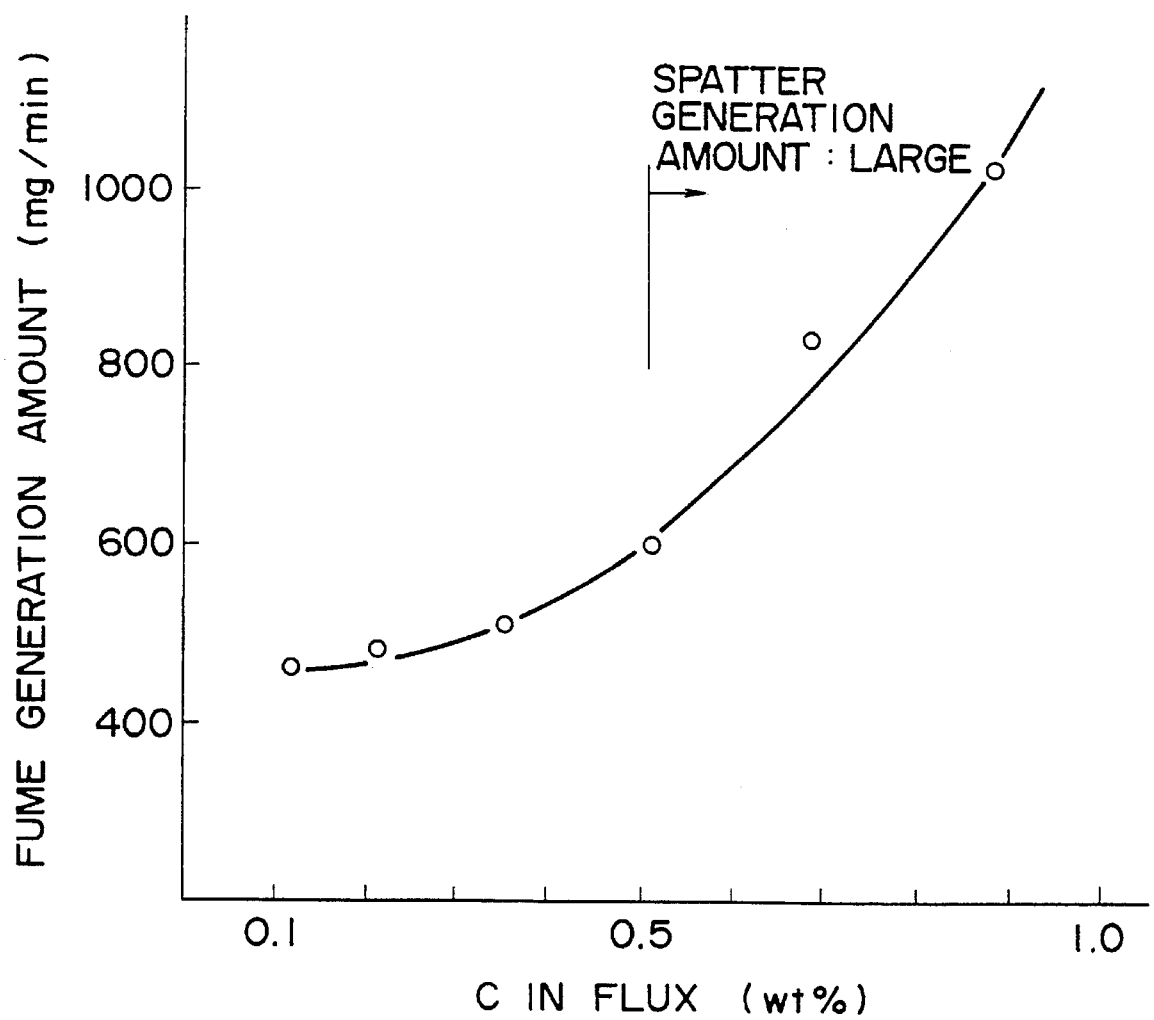
FIG. 7 is a graph showing a relationship between the amount of fume generation and the C content in a titania based flux.
Figure 8:
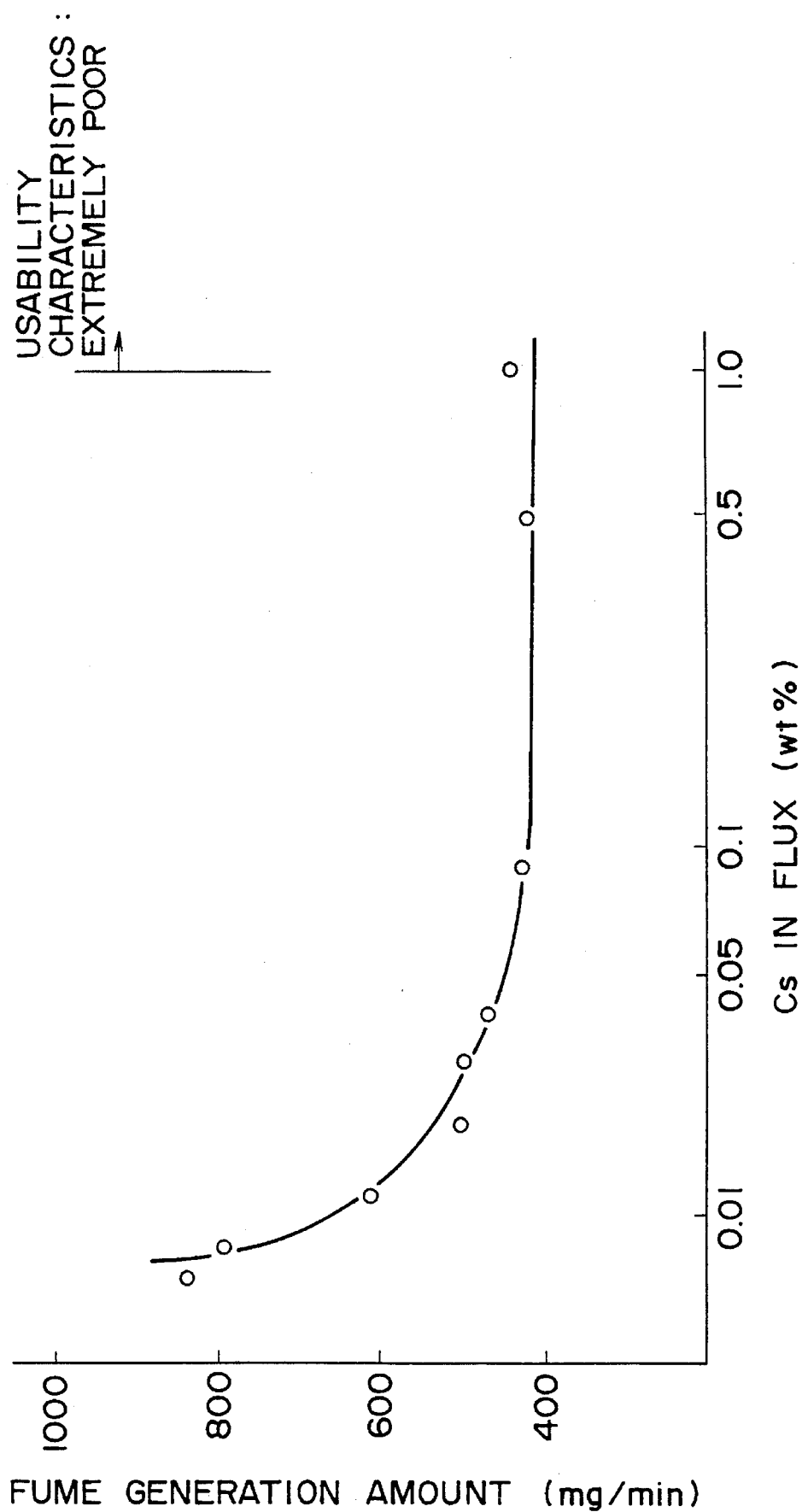
FIG. 8 is a graph showing a relationship between the amount of fume generation and the Cs content in a titania based flux.

The test results are shown in FIGS. 7 and 8. As will be apparent from these figures, to reduce the amount of fume generation of the titania based flux-cored wire, ①the content of C, ②the content of Cs, and ③the ratio of $TiO_2$/Cs are important in viewpoint of the flux composition; and ④the content of C, and ⑤the content of Ti are important in the viewpoint of the steel sheath composition. In addition, the present inventors have found the fact that, to reduce the fume in the titania based flux-cored wire, the addition of only one of the flux composition and the steel sheath composition is effective; however, the addition of the combination thereof is further effective.

On the basis of the above experimental results, the titania based flux-cored wire for achieving the reduction in the amount of fume generation includes a mild steel sheath and a flux composition filled in the mild steel sheath, wherein the flux composition is filled in the mild steel sheath in an amount of 5 to 30% based on the weight of the total wire; and the flux composition contains, based on the weight of the total flux, 8 to 60% of $TiO_2$, 0.01 to 1.0% of Cs compounds (Cs converted value) and 0.5% or less of C, the ratio between $TiO_2$/compounds of Cs (Cs converted value) being in the range of from 20 to 2000.

C is added in the flux under the consideration of the C content in the sheath, if needed, to be as a deoxidizing agent, to secure strength and toughness by enhancement of hardenability, and to improve penetration depth by acceleration of arc concentration. In this case, the addition of C in excess of 0.5% significantly increases the amount of fume generation and also significantly increases the amount of spatter generation (see FIG. 7). The reason for this is that, when the C content is more than 0.5%, CO and $CO_2$, which are regarded as the source of fume generation, are explosively produced by the reaction between C and $O_2$. Accordingly, the C content in the flux is limited to be 0.5% or less.

The mechanism of reducing the amount of fume generation by the addition of Cs is unclear; however, one reason for this is due to the fact that Cs reduces the potential gradient of arc, to enhance the arc stability. The effect of reducing the amount of fume generation by the addition of Cs is shown in FIG. 8. When the Cs content is less than 0.01%, the above effect is not obtained. Meanwhile, over 1.0%, the amount of spatter generation is rather increased and the hygroscopicity of flux is significantly enhanced, to increase the generation amount of hydrogen in weld, thus deteriorating the quality and the cracking resistance of the weld. Accordingly, the Cs content is in the range of from 0.01 to 1.0%.

In addition, the sources of Cs include $CsCO_3$, complex oxides with $SiO_2$ etc. and natural poilucite ore, and further the single salt or complex salt obtained the synthesis of poilucite ore. However, when the source of Cs is added in excess of 1.0% (Cs converted value), the usability characteristics become extremely poor.

$TiO_2$ is expected to act as a slag forming agent and an arc stabilizer. $TiO_2$ is required to be added in an amount of 8% or more to improve bead appearance/shape and arc stability in downward or horizontal welding. However, when the $TiO_2$ content is more than 60%, the solidifying point of slag is increased, and the viscosity of slag is excessively increased, tending to generate slag inclusion and gas defect on the surface of bead. Accordingly, the $TiO_2$ content is in the range of from 8 to 60%.

In addition, the sources of $TiO_2$ include oxides such as rutile, reduced ilmenite, leucoxene, ilmenite and potassium titanate.

Figure 9:
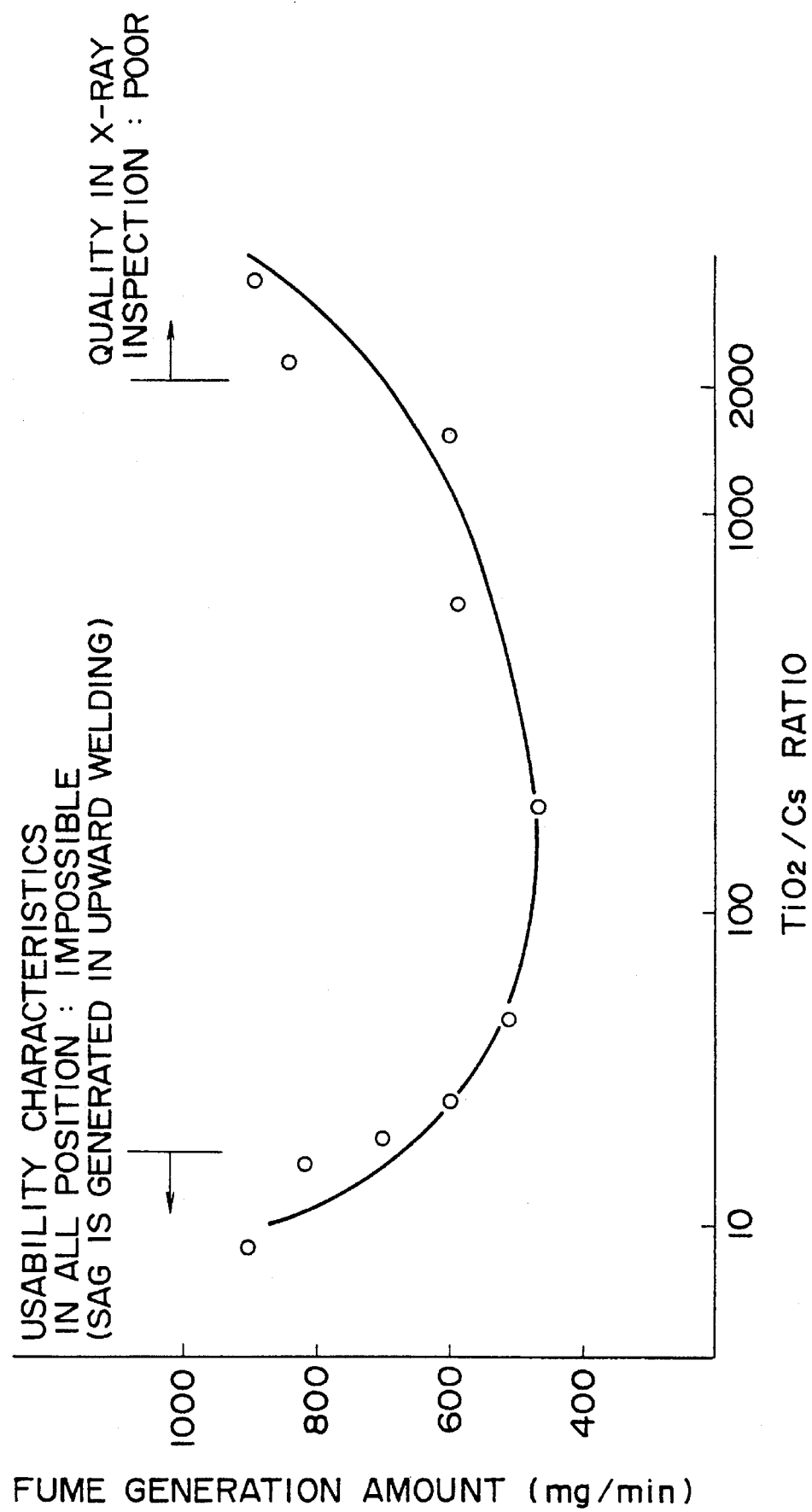
FIG. 9 is a graph showing a relationship between the amount of fume generation and the $TiO_2$/Cs ratio in a titania based flux.
Figure 10A:
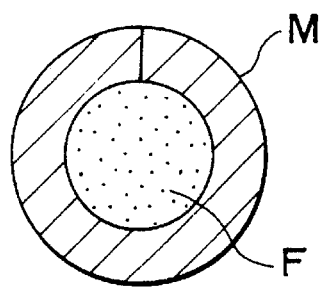
FIG. 10 is a view showing an example of the sectional shape of a flux-cored wire.
Figure 10B:
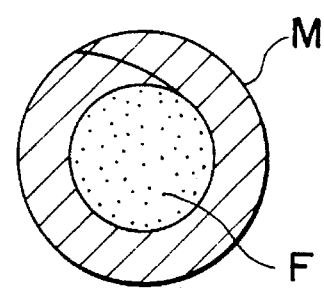
Figure 10C:
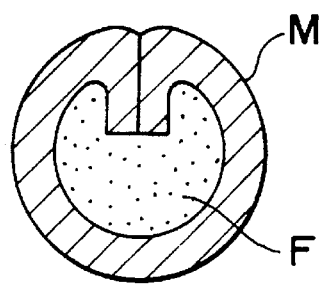
Figure 10D:
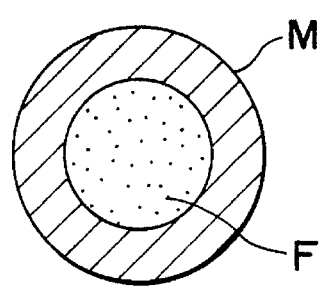

Although the addition effect of single $TiO_2$ or Cs is described above, both effects are related to the respective added amounts. Namely, the $TiO_2$/Cs ratio also exerts on the generation amount of fume, bead sag in vertical upward welding, and quality in X-ray inspection of weld (incomplete fusion, slag inclusion and the like) (see FIG. 9). To obtain the excellent usability characteristics in all positions, or to obtain good weld, the $TiO_2$/Cs ratio must be in the range of 20 or more. However, it exceeds 2000, the effect of reducing welding fume by the addition of Cs is reduced and the quality in X-ray inspection of weld is deteriorated. Accordingly, the $TiO_2$/Cs ratio is suppressed to be 2000 or less.

In addition, compounds of alkali metals such as Li, Na and K, other than Cs may be added in suitable amounts, if needed. The compounds of these alkali metals, other than Cs, are very effective to improve arc stability and to reduce the generation amount of spatter; however, they also act as sources of significantly generating welding fume. Namely, fluorides, carbonates, single oxides such as $Na_2O$, $K_2O$ and Li$_2$O of these alkali metals act as the sources of significantly generating welding fume, and even in the form of the complex oxides with other oxides, they act also as the sources of generating welding fume. Accordingly, the added amount of compounds of alkali metals other than Cs are suppressed to be in the range of 7.0% or less (metal element converted value).

In addition, other components, which are commonly added in the titania based flux-cored wire, may be of course in this flux.

Moreover, the sheath metal is made of a common mild steel, and particularly is made of a mild steel containing 0.02% or less of C and 0.20% or less of Ti for reducing the amount of fume generation.

The mild steel sheath further effective to reduce fume is made of a mild steel containing, based on the weight of the total sheath, 0.01% or less of C, 0.01 to 0.10% of Ti, and 0.01 to 0.05% of Al, the contents of Ti and C satisfying a relation of (Ti/C≧3.0) and the contents of Al and C satisfying a relation of (Al≧2.0).

Under the consideration of the workability in the rolling and/or drawing process for wire fabrication, the other components are limited such that Mn is in the range of from 0.10 to 0.70%, and Si is 0.35% or less.

In general, the flux ratio is determined in combination with the wire sectional shape, in terms of the uniformity in fusion of wire and workability of the wire. The low flux ratio and the single sectional shape are desirable for a small diameter wire; while a high flux ratio and a complex sectional shape are desirable for a large diameter wire. However, in either case, when the flux ratio is less than 5%, spatter of large grain is increased; while, over 30%, the sheath is thinned, to lower wire feedability. Accordingly, the flux ratio is in the range of from 5 to 30%.

(4) Reduction of fume mainly by adjustment of sheath composition and flux composition (metal based)

Next, the reduction of fume mainly by adjustment of a mild steel sheath composition and the metal based flux composition according to the present invention will be described in detail.

The present inventors have found that the generation amount of fume can be significantly reduced in a multiplier manner by suitably controlling the contents of C, Ti and Al in a mild steel sheath, and adding Cs and Rb as alkali metals in the metal based flux. The experimental results will be described below.

In these experiments, flux-cored wires (diameter: 1.4 mm) were fabricated using the metal based flux composition (flux ratio: 15%) shown by No. 1 in Table 13 described later in combination with mild steel sheaths (C: 0.003–0.03%, Mn: 0.20–0.30%, Si: 0.01–0.03%, P: 0.008–0.011%, S: 0.005–0.007%, N: 0.002–0.004%, and Ti and Al: variable).

The wires thus obtained were used for performing a downward bead-on plate welding test using a test plate (JIS G3106 SM490A, thickness: 12 mm) under the following welding conditions. The wires thus obtained were tested under the following welding conditions for examining the effect of reducing welding fume according to JIS Z3930.

(Welding conditions)
Welding current: 350 A
Welding voltage: 36 V
Welding rate: 30 cm/min
Wire extension: 25 mm
Polarity: DCEP (wire: plus)
Shield gas: CO$_2$ (flow rate: 25 l/min)

Figure 11:
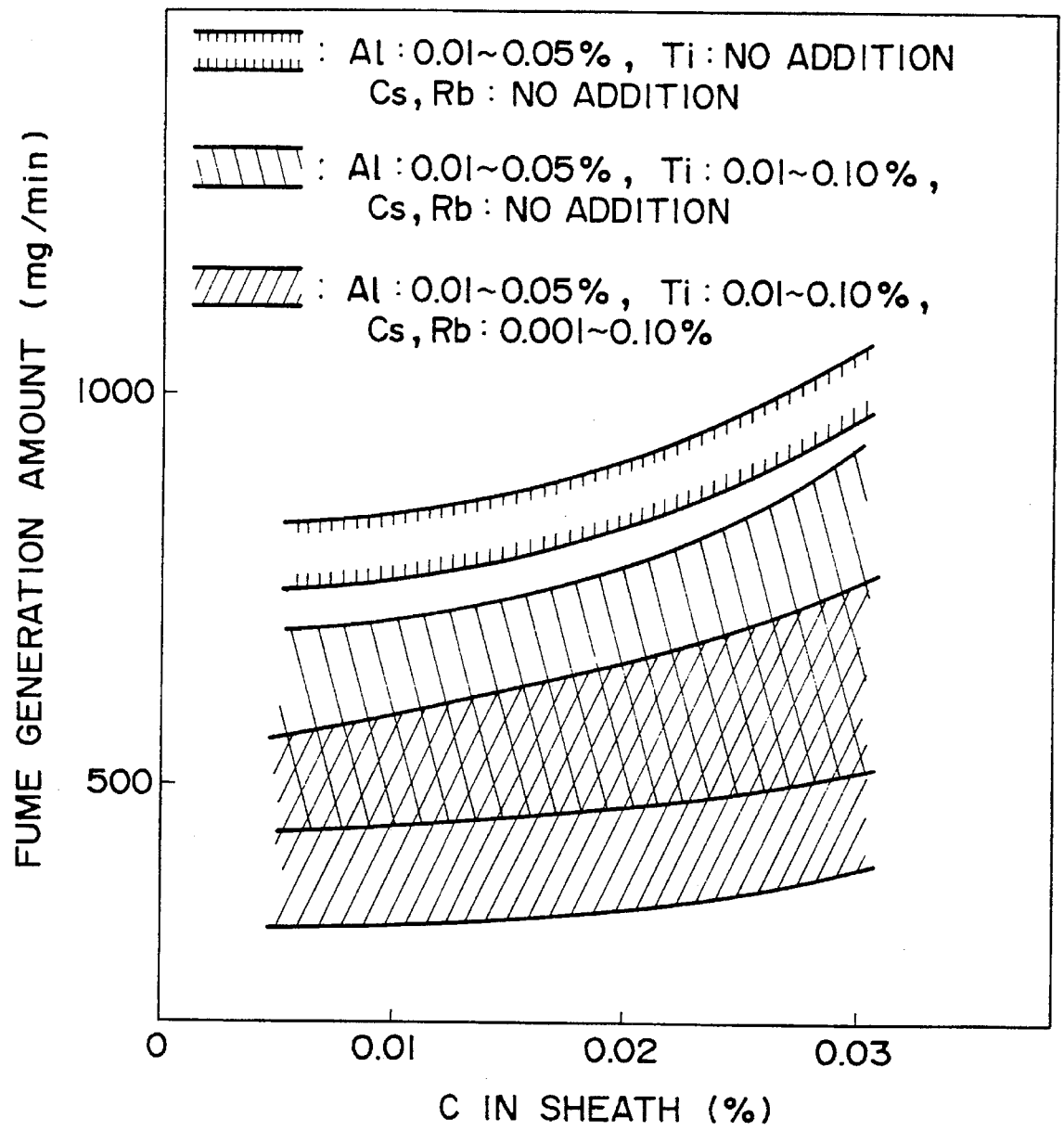
FIG. 11 is a graph showing a relationship between the amount of fume generation and the C content in a mild steel sheath of a metal based flux-cored wire.
Figure 12:
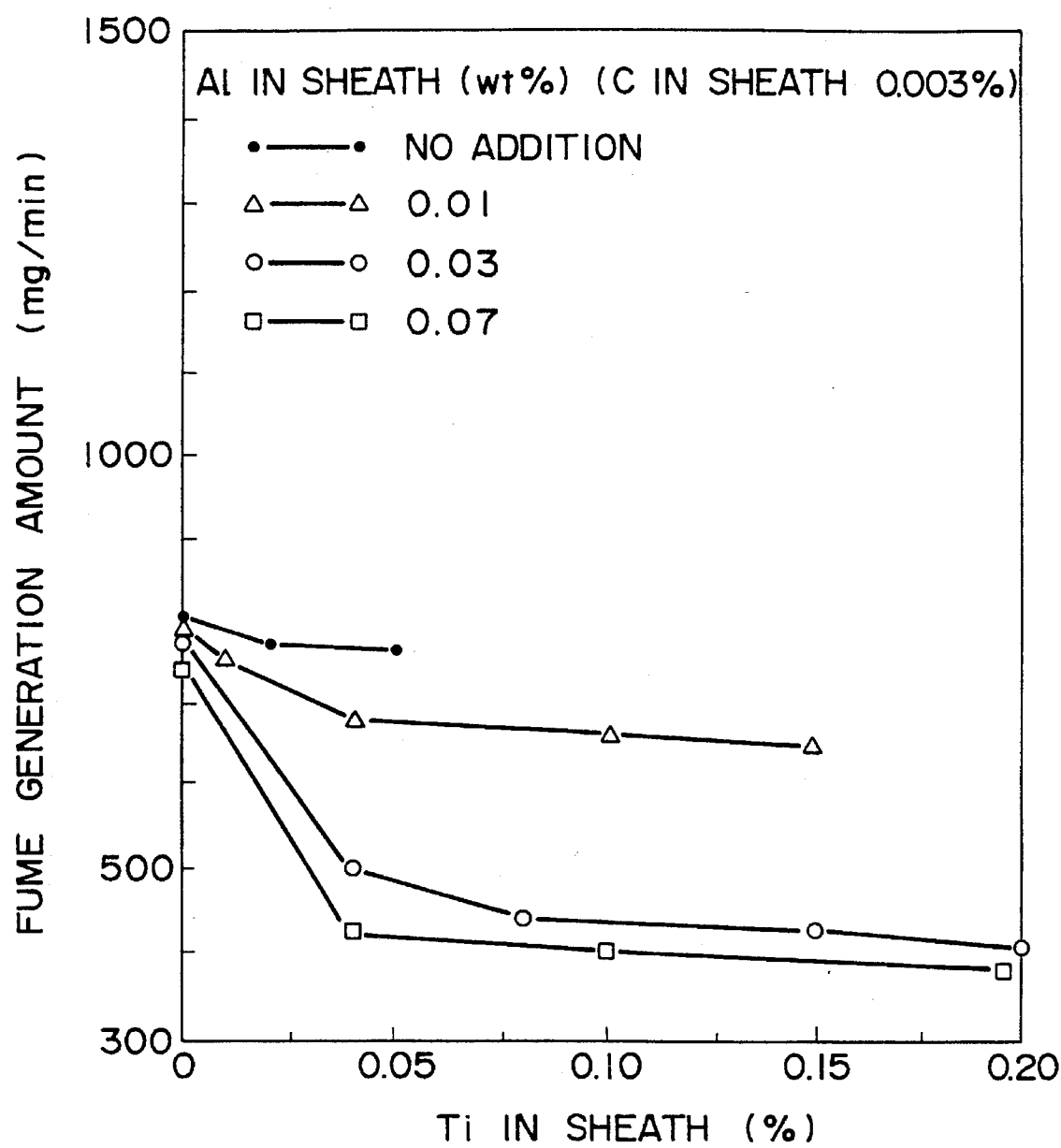
FIG. 12 is a graph showing a relationship between the amount of fume generation and the Ti content in a mild steel sheath of a metal based flux-cored wire.

FIGS. 11 and 12 show relations between the generation amount of welding fume and the contents of Ti, Al and C in a mild steel sheath, which are obtained on the basis of the above experiments. As will be apparent from FIGS. 11 and 12, with respect to the mild steel sheath, the complex addition of Ti and Al in respective amounts of 0.01% or more are effective to reduce the amount of fume generation, in addition to the reduction of the C content according to the conventional technique. Moreover, it is revealed that the addition of only Al is a little effective; but the complex addition of Al and Ti is significantly effective. Additionally, the addition of Ti and Al becomes effective for reducing welding fume under the conditions that C≦0.02%, Ti/C≧1.0%, and Al/C≧1.5%.

The reason why the addition of Ti and Al is effective for reducing welding fume is that Ti and Al have high affinity with oxygen and generate oxides having high solidifying points, to form an oxide film on the surface of hanging droplet at the tip of a wire during arc welding, thus suppressing the explosive generation of CO and CO$_2$, which is regarded as the source of fume generation, caused by the reaction between O$_2$ and C.

Moreover, the upper limits of Ti and Al must be Ti≦0.20% and Al≦0.10% for avoiding the material deterioration such as reduction in ductility and hardening caused by the yield thereof in weld.

Figure 13:
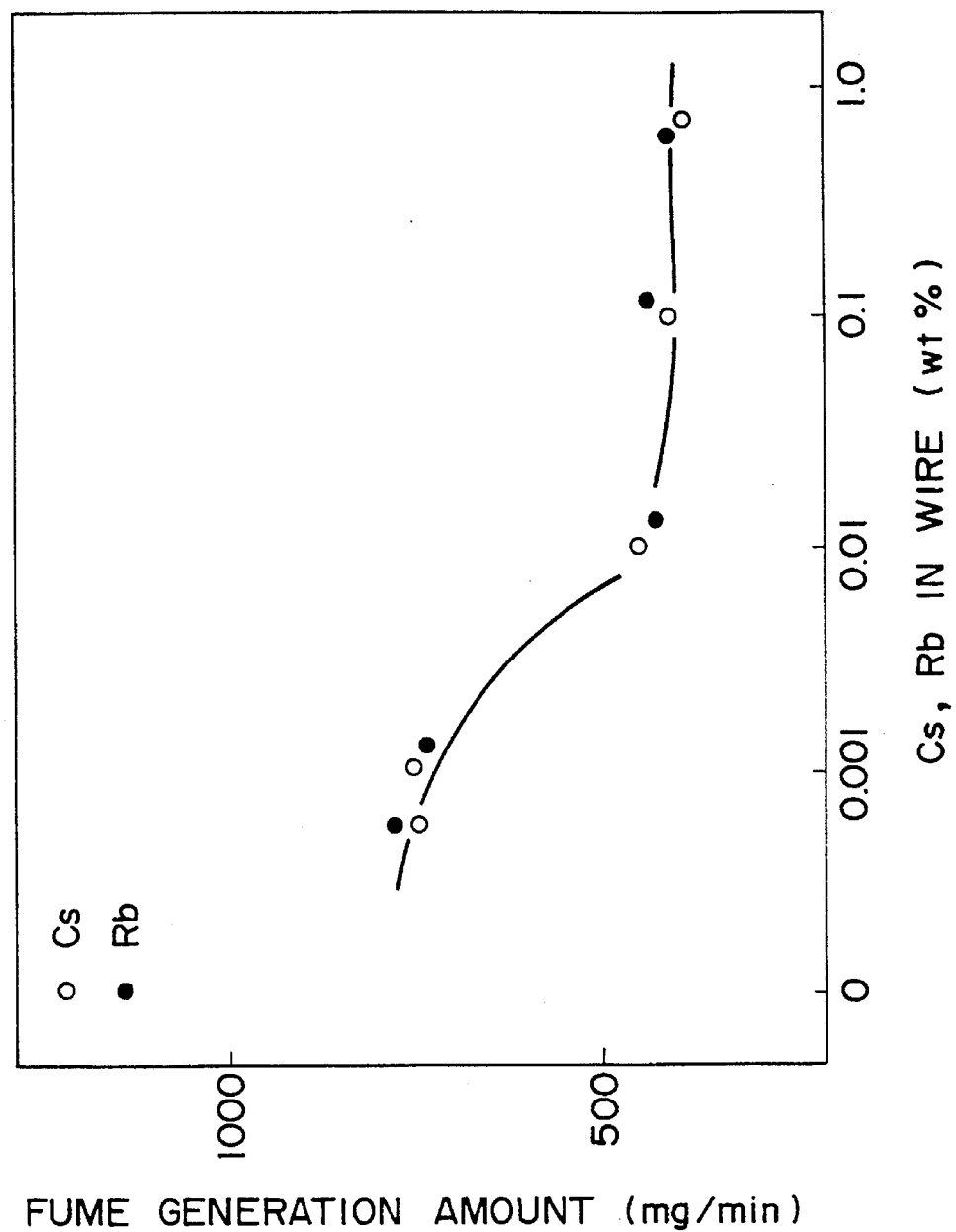
FIG. 13 is a graph showing a relationship between the amount of fume generation and the contents of Cs and Rb in a flux of a metal based flux-cored wire.

Additionally, as will be apparent from FIG. 13, the amount of welding fume generation is significantly reduced by the addition of Cs and Rb in the flux.

For this reason, a mild steel sheath suitable for reducing welding fume contains, based on the weight of the total sheath, 0.02% or less of C, 0.01 to 0.20% of Ti, and 0.01 to 0.10% of Al, the contents of Ti and C satisfying a relation of (Ti/C≧1.0) and the contents of Al and C satisfying a relation of (Al/C≧1.5).

Preferably, the above mild steel contains 0.01% or less of C, 0.01 to 0.10% of Ti, and 0.01 to 0.05% of Al, the contents of Ti and C satisfying a relation of (Ti/C≧3.0) and the contents of Al and C satisfying a relation of (Al/C≧2.0).

In addition, under the consideration of the workability in the rolling and/or drawing processes for wire fabrication, preferably, the content of Mn is in the range of from 0.10 to 0.70% and the content of Si is in the range of 0.35% or less.

The metal based flux composition suitable for reducing welding fume contains, based on the weight of the total wire, 0.01 to 0.30% (alkali metal converted value) of one or more kind of oxides and fluorides of alkali metals excluding Cs and Rb, 5 to 28% of Fe powder, 94% or more (based on the weight of the total wire) of metal powder, and 0.001 to 0.10% (Cs or Rb converted value) of one or two kinds of Cs and/or Rb; and further 0.5% to 3.60% of Mn (including the Mn amount in the sheath) and 0.10 to 1.8% of Si (including the Si content in the sheath).

In the above metal based flux, when the total amount of one or two kinds of Cs and Rb is less than 0.001%, the effect of reducing welding fume is not obtained (see FIG. 13). However, over 0.10%, hygroscopicity is deteriorated, to reduce blowhole resistance and increase the generation amount of diffusive hydrogen in weld, thereby deteriorating cracking resistance. Cs and Rb are added in the suitable form, and particularly, Cs is added in the form of CsCO$_3$ or in the form of complex oxides with TiO$_2$ or SiO$_2$. The values of Cs and/or Rb are obtained by converting Cs and/or Rb in the compound thereof into the elements. The content of Cs and/or Rb is in the range of from 0.001 to 0.010%.

Alkali metals such as Li, Na and K (excluding Cs and Rb) are added to reduce arc stability and amount of spatter generation. Alkali metals are significantly large in hygroscopicity; accordingly, they are desirable to be added by one or more kinds in the form of oxides or fluorides. The reason why the contents of alkali metals are specified in the above range is as follows. Namely, when the content of alkali metals is less than 0.01%, the effects to improve arc stability and to reduce the amount of spatter generation cannot be obtained. Meanwhile, when being more than 0.30%, the amount of spatter generation is rather increased and the fume reducing effect by the addition of Ti and Al is not obtained, because alkali metals are high in vapor pressure.

In addition, feldspar, sodium silicate anhydride, water glass, complex oxides of Li, Na, K and the like, cryolite, fluorides such as potassium silicofluoride, sodium silicofluoride, and carbonates of alkali metals in small amounts are similarly effective, since they are dissolved by welding arc into oxides. The added amount of the present invention is converted into the alkali metal element, and is preferably in the range of from 0.01 to 0.10%.

Fe powder is added according to the flux ratio, to obtain a high deposition rate. When the flux ratio (% based on the weight of the total wire) is less than 10%, spatter of large grain is increased because the wall thickness of the sheath is excessively thick. Meanwhile, over 30%, the wire is softened along with the reduction in the wall thickness of the sheath, to lower the feedability of the wire; and arc is significantly expanded, tending to reduce penetration depth and to generate undercut. Accordingly, the flux ratio is preferably in the range of from 10 to 30%.

Fe powder is added according to the above flux ratio; however, less than 5%, it is difficult to obtain a high deposition rate which is regarded as the feature of the metal based flux-cored wire. Meanwhile, over 28%, the other components such as a deoxidizing agent are insufficient, which makes it difficult to secure the specified mechanical properties of weld and prevent weld defects such as blowhole. Accordingly, Fe powder is specified to be in the range of from 5 to 28%.

To secure the high deposition rate as the feature of the metal based flux-cored wire and the slag amount sufficient for continuous multi-layer welding, the metal powder ratio in the flux excluding non-metals such as oxide, fluoride and carbonate, must be in the range of 94% or more.

Mn is added in the flux under the consideration of the Mn content in the sheath, to act as a deoxidizing agent, to improve strength and toughness by enhancement of hardenability, and to improve bead shape (especially in horizontal fillet welding) due to an increase in the viscosity of molten metal slag. In this case, when the Mn content is less than 0.5%, sufficient strength for mild steel is not obtained, and bead shape is poor. Meanwhile, over 3.6%, the strength of weld is excessively increased, tending to generate low temperature cracking. Accordingly, the Mn content is in the range of 0.5 to 3.6%, preferably, from 0.5 to 2.5%. The sources of Mn include Mn, Fe-Mn, Fe-Si-Mn and the like.

Si has the function and effect similar to those of Mn. However, when the Si content is less than 0.1%, it is not effective to act as a deoxidizing agent, to enhance toughness, and to improve bead shape. Meanwhile, over 1.8%, the yield of Si in weld is excessively large, to lower toughness and ductility. Accordingly, the Si content is in the range of from 0.1 to 1.8, preferably, from 0.3 to 1.2%. The sources of Si include metal Si, and alloys such as Fe-Si, Fe-Si-Mn, and Fe-Si-Mg.

Moreover, within the range of satisfying the above ratio of metal powder, oxides such as $SiO_2$, $ZrO_2$, CaO and FeO may be added to further improve the bead appearance/shape; and both bismuth oxide ($Bi_2O_3$) in an amount of 0.1% or less (based on the weight of the total wire) not to generate high temperature cracking, and MgO or Mg in an amount of 0.2% or less (based on the weight of the total wire) not to deteriorate the bead shape, may be added to improve slag removability.

Additionally, the kinds of base steels to which the present invention is applied mainly include mild steel and high tensile steel; however, by the addition of Ni, Cr, Mo and Cu and alloys thereof, the application range may be extended to low alloy steel and high alloy steel.

The flux-cored wire described above is not limited to its wire sectional shape, and uses various shapes shown in (A) to (D) of FIG. 10. Moreover, the surface of a wire may be applied with plating of Cu or Al to a thickness of 0.05 to 0.35%. The wire diameter may be freely selected according to the application.

The examples of shield gases include oxidizing gas, natural gas and reducing gas. As the common shield gas, there may be used a $CO_2$ gas or a mixed gas of two kinds of Ar, $CO_2$, $O_2$ and He.

The present invention will be more clearly understood with reference to the following examples.

EXAMPLE 1

This example is performed to examine the effect of reducing the fume mainly by adjustment of the sheath composition, in combination with the preferred metal based flux composition.

Flux-cored wires (diameter: 1.4 mm) having a sectional shape shown in (A) of FIG. 10 were fabricated, using steel sheaths having the chemical compositions shown in Table 1, in which fluxes having the compositions shown in tables 2 and 3 were filled. Next, each flux-cored wire was used for performing a welding test under the following conditions for examining the amount of fume generation and the usability characteristics.

(Welding Condition)
Polarity: DCEP (wire: plus)
Welding current: 350 A
Welding voltage: 37±3 V
Welding rate: 30 cm/min
Shield gas: 100% $CO_2$ (flow rate: 25l/min)
Distance between tip and base metal: 25 mm
Test plate: JIS G3106, SM490A (thickness: 12 mm)
Welding process: downward bead-on plate welding (Measurement for Fume)

In accordance with JIS Z 3930 "Method of Measuring Total Fume Amount of Covered Electrode", the value per time (g/min) (average value, repeated number: 3) was obtained by measuring the weight of fume generated during welding for 1 min. The fume was collected by an apparatus provided with a collecting box shown in FIG. 3.

(Usability Characteristics)

This was evaluated by sensory analysis.

From the results shown in Table 4, the following considerations were made.

Wire Nos. 1 to 8 are cases where the sheath compositions are suitably adjusted, in which the amount of fume generation is extremely reduced.

On the contrary, Wire Nos. 9 to 16 are cases where either of the sheath components is not suitable.

Concretely, Wire No. 9 is a case where the C content is larger, in which the amount of fume generation is increased. Wire Nos. 10 and 11 are cases where the Ti content in the sheath is not suitable. In these wires, when the Ti content is smaller, the amount of fume generation is increased, while when it is larger, the yield in weld is increased to lower the toughness. Wire Nos. 12 and 13 are cases where the Al content is not suitable. In these wires, when the Al content is smaller, the amount of fume generation is increased; while when it is larger, the toughness of weld is lowered. Wire No. 14 is not suitable in the Ti/C ratio of the sheath, and Wire No. 15 is not suitable in the Al/C ratio of the sheath, with a result that the amount of fume generation is increased. Wire No. 16 is not suitable in the contents of C, Ti and Al, and further the Ti/C ratio and the Al/C ratio, in which the amount of fume generation is significantly increased.

Moreover, Wire Nos. 17 to 30 are cases where the sheath compositions are suitably adjusted but the metal based flux compositions are not suitably adjusted.

Concretely, Wire Nos. 17 and 18 are cases where the contents of Ti or Ti oxide (Ti converted value) in the flux is not suitable. In these case, when it is smaller, the amount of fume generation is increased and arc stability is deteriorated, while when it is larger, the toughness of weld is lowered. Wire No. 19 is a case where the Al content is not suitable, with a result that the ductility of weld is lowered. Wire No. 20 is a case where the Ti/C ratio is not suitable, in which the effect of reducing fume is not obtained. Wire No. 21 is a case where the C content is out of the scope of the present invention, with a result that the amount of fume generation is increased. Wire Nos. 22 and 23 are cases where the contents of alkali metals are not suitable. In these cases, when they are smaller, arc stability is deteriorated and the amount of spatter generation is increased, while when they are larger, the amount of spatter generation is increased and the effect of reducing fume is harmed. Wire Nos. 24 and 25 are cases where the Fe content in the flux is not suitable. In these cases, when it smaller, spatter of large grain is increased; while when it is larger, the wall thickness of the sheath is thinned, to deteriorate feedability, tending to generate weld defects such as undercut. Wire No. 26 is a case where the ratio of metal powder is not suitable, in which the efficiency as the feature of the metal based flux-cored wire is harmed, and the amount of slag generation is increased thereby making difficult continuous multi-layer welding. Wire Nos. 27 and 28 are cases where the Mn content is not suitable. In these cases, when it is smaller, sufficient strength is not obtained and bead shape is deteriorated, while when it is larger, strength is excessively increased thus tending to generate low temperature cracking. Wire Nos. 29 and 30 are cases where the Si content is not suitable. In these cases, when it is smaller, bead shape is deteriorated, while when it is larger, the toughness and ductility of weld are lowered.

Moreover, Wire No. 31 is a case where all of the requirements contributing to the reduction in the amount of fume generation (the contents of C, Ti and Al, and further the Ti/C and Al/C in the flux; and the contents of Ti and C and further the Ti/C in the sheath) are not suitable, in which the generation amount of fume is significantly increased.

TABLE 1

| No. | Sheath Metal Composition (wt %) | | | | | | |
|---|---|---|---|---|---|---|---|
| | C | Si | Mn | Ti | Al | Ti/C | Al/C |
| 1 | 0.005 | 0.02 | 0.25 | 0.06 | 0.04 | 12.0 | 8.0 |
| 2 | 0.015 | " | 0.20 | 0.05 | 0.03 | 3.3 | 2.0 |
| 3 | 0.010 | " | " | 0.15 | 0.06 | 15.0 | 6.0 |
| 4 | " | " | " | 0.04 | 0.02 | 4.0 | 2.0 |
| 5 | 0.005 | " | 0.25 | 0.06 | 0.04 | 12.0 | 8.0 |
| 6 | " | " | " | " | " | " | " |
| 7 | " | " | " | " | " | " | " |
| 8 | " | " | " | " | " | " | " |
| 9 | 0.025 | " | " | " | " | 2.4 | 1.8 |
| 10 | 0.005 | " | " | 0.005 | " | 1.0 | 8.0 |
| 11 | " | " | " | 0.22 | " | 44.0 | " |
| 12 | " | " | " | 0.06 | 0.008 | 12.0 | 1.6 |
| 13 | " | " | " | " | 0.12 | " | 24.0 |
| 14 | 0.018 | " | " | 0.015 | 0.04 | 0.8 | 2.2 |
| 15 | " | " | " | 0.06 | 0.02 | 3.3 | 1.1 |
| 16 | 0.022 | " | " | 0.005 | 0.005 | 0.2 | 0.2 |
| 17 | 0.005 | " | " | 0.06 | 0.04 | 12.0 | 8.0 |
| 18 | " | " | " | " | " | " | " |
| 19 | " | " | " | " | " | " | " |
| 20 | " | " | " | " | " | " | " |
| 21 | " | " | " | " | " | " | " |
| 22 | " | " | " | " | " | " | " |
| 23 | " | " | " | " | " | " | " |
| 24 | " | " | " | " | " | " | " |
| 25 | " | " | " | " | " | " | " |
| 26 | " | " | " | " | " | " | " |
| 27 | " | " | " | " | " | " | " |
| 28 | " | " | " | " | " | " | " |
| 29 | " | " | " | " | " | " | " |
| 30 | " | " | " | " | " | " | " |
| 31 | 0.022 | " | " | 0.005 | 0.005 | 0.2 | 0.2 |

TABLE 2

| No. | Flux Composition (wt % based on total wire) | | | | | | | | | | | | Metal Powder Ratio (%) |
|---|---|---|---|---|---|---|---|---|---|---|---|---|---|
| | Ti | TiO$_2$ | Al | Al$_2$O$_3$ | C | Mn | Si | NaF | SiO$_2$ | K$_2$O | Fe Powder | Ti/C | (to Flux) |
| 1 | 0.14 | 0.25 | 0.10 | 0.10 | 0.02 | 2.01 | 0.96 | — | 0.14 | 0.03 | 11.25 | 14.5 | 96.5 |
| 2 | " | " | " | " | " | " | " | — | " | " | " | " | " |
| 3 | " | " | " | " | " | " | " | — | " | " | " | " | " |
| 4 | " | " | " | " | " | " | " | — | " | " | " | " | " |
| 5 | " | " | " | " | 0.05 | 1.50 | 1.0 | — | " | " | 11.69 | 5.8 | " |
| 6 | 0.30 | " | 0.20 | " | 0.02 | 2.00 | 0.80 | 0.01 | " | " | 11.15 | 22.5 | " |
| 7 | 0.10 | 0.10 | " | 0.50 | 0.06 | 2.10 | 0.90 | " | 0.20 | 0.05 | 10.78 | 2.7 | 94.3 |
| 8 | 0.14 | 0.25 | 0.10 | 0.10 | 0.02 | 2.01 | 0.96 | — | 0.14 | 0.03 | 16.25 | 14.5 | 97.4 |
| 9 | " | " | " | " | " | " | " | — | " | " | 11.25 | " | 96.5 |
| 10 | " | " | " | " | " | " | " | — | " | " | " | " | " |
| 11 | " | " | " | " | " | " | " | — | " | " | " | " | " |
| 12 | " | " | " | " | " | " | " | — | " | " | " | " | " |
| 13 | " | " | " | " | " | " | " | — | " | " | " | " | " |
| 14 | " | " | " | " | " | " | " | — | " | " | " | " | " |

TABLE 2-continued

| | Flux Composition (wt % based on total wire) | | | | | | | | | | | Metal Powder Ratio (%) |
|---|---|---|---|---|---|---|---|---|---|---|---|---|
| No. | Ti | TiO₂ | Al | Al₂O₃ | C | Mn | Si | NaF | SiO₂ | K₂O | Fe Powder | Ti/C | (to Flux) |
| 15 | " | " | " | " | " | " | " | — | " | " | " | " | " |
| 16 | " | " | " | " | " | " | " | — | " | " | " | " | " |

(Note) Wire Nos. correspond to those in Table 1.

TABLE 3

| | Flux Composition (wt % based on total wire) | | | | | | | | | | | Metal Powder Ratio (%) |
|---|---|---|---|---|---|---|---|---|---|---|---|---|
| No. | Ti | TiO₂ | Al | Al₂O₃ | C | Mn | Si | NaF | SiO₂ | K₂O | Fe Powder | Ti/C | (to Flux) |
| 17 | 0.01 | — | 0.10 | 0.10 | 0.01 | 2.01 | 0.96 | — | 0.14 | 0.03 | 11.64 | 1.0 | 98.2 |
| 18 | 1.2 | — | " | " | 0.02 | " | " | — | " | " | 10.44 | 60.0 | " |
| 19 | 0.14 | 0.25 | 1.2 | — | " | " | " | — | " | " | 10.25 | 14.5 | 97.2 |
| 20 | 0.04 | — | 0.10 | 0.10 | 0.05 | " | " | — | " | " | 11.57 | 0.8 | 98.2 |
| 21 | 0.14 | 0.25 | " | " | 0.08 | " | " | — | " | " | 11.18 | 3.6 | " |
| 22 | " | " | " | " | 0.02 | " | " | — | " | 0.01 | 11.27 | 14.5 | 96.7 |
| 23 | " | " | " | " | " | " | " | 0.01 | " | 0.20 | 11.07 | " | 95.3 |
| 24 | " | — | " | — | " | " | " | — | " | 0.03 | 4.6 | 7.0 | 97.9 |
| 25 | " | 0.25 | " | 0.10 | " | " | " | — | " | " | 29.25 | 14.5 | 98.4 |
| 26 | " | 0.40 | " | 0.50 | " | " | " | — | " | " | 10.7 | 19.0 | 92.9 |
| 27 | " | 0.25 | " | 0.10 | " | 0.20 | " | — | " | " | 13.06 | 14.5 | 96.5 |
| 28 | " | " | " | " | " | 3.70 | " | — | " | " | 9.56 | " | " |
| 29 | " | " | " | " | " | 2.01 | 0.05 | — | " | " | 12.16 | " | " |
| 30 | " | " | " | " | " | " | 1.90 | — | " | " | 10.31 | " | " |
| 31 | 0.01 | — | " | " | 0.08 | " | 0.96 | — | " | " | 11.57 | 0.1 | 98.2 |

(Note) Wire Nos. correspond to those in Table 1.

TABLE 4

| | Fume Generation | Usability Characteristics, Efficiency, Welding Performance or the like | |
|---|---|---|---|
| No. | Amount (mg/min) | Item | Determination |
| 1 | 505 | — | — |
| 2 | 520 | — | — |
| 3 | 508 | — | — |
| 4 | 530 | — | — |
| 5 | 510 | — | — |
| 6 | 490 | — | — |
| 7 | 515 | — | — |
| 8 | 500 | — | — |
| 9 | 610 | — | — |
| 10 | 810 | — | — |
| 11 | 485 | Ductility | x |
| 12 | 700 | — | — |
| 13 | 480 | Ductility | x |
| 14 | 712 | — | — |
| 15 | 617 | — | — |
| 16 | 931 | — | — |
| 17 | 604 | — | — |
| 18 | 511 | Ductility | x |
| 19 | 502 | " | x |
| 20 | 605 | — | — |
| 21 | 600 | — | — |
| 22 | 507 | Spatter (arc stability) | Δ |
| 23 | 590 | Spatter | Δ |
| 24 | 520 | Spatter (large grain) | x |
| 25 | 513 | Feedability | Δ |
| 26 | 512 | Efficiency | Δ |
| 27 | 535 | Strength, Bead Shape | x |
| 28 | 496 | Strength, Cracking | Δ |
| 29 | 529 | Bead Shape | x |
| 30 | 510 | Toughness, Ductility | x |
| 31 | 1020 | — | — |

EXAMPLE 2

This example is performed to examine the effect of reducing the fume mainly by adjustment of the sheath composition, in combination of the preferred titania based flux composition.

Flux-cored wires (diameter: 1.2 mm) having a sectional shape shown in (A) of FIG. 10 were fabricated, using steel sheaths having the chemical compositions shown in Table 5, in which fluxes having the compositions shown in Table 6 were filled. Next, each flux-cored wire was used for performing a welding test under the following conditions for examining the generation amount of fume and the usability characteristics.

(Welding Condition)
Polarity: DCEP (wire: plus)
Welding current: 280 A
Welding voltage: 30 V
Welding rate: 30 cm/min
Shield gas: 100% $CO_2$ (flow rate: 25 l/min)
Distance between tip and base metal: 25 mm
Test plate: JIS G3106, SM490A (thickness: 12 mm)
Welding process: horizontal fillet welding
  (Measurement for Fume)
In accordance with JIS Z 3930 "Method of Measuring Total Fume Amount of Covered Electrode", the value per time (g/min) (average value, repeated number: 3) was obtained by measuring the weight of fume generated during welding for 1 min. The fume was collected by an apparatus provided with a collecting box shown in FIG. 3.
  (Usability Characteristics)
This was evaluated by sensory analysis.
From the results shown in Table 7, the following considerations were made.

Wire Nos. 1 to 8 are cases where the sheath compositions are suitably adjusted, in which the amount of fume generation is lowered and the usability characteristics are desirable.

On the contrary, Wire No. 9 is a case where the Ti/C of the sheath is not suitable, with a result that the amount of fume generation is increased. Wire No. 10 is a case where Al/C of the sheath is not suitable, with a result that the amount of fume generation is significantly increased.

Moreover, Wire Nos. 11 to 15 are cases where the sheath compositions are suitably adjusted but the titania based flux compositions are not suitably adjusted.

Concretely, Wire No. 11 is a case where the content of $TiO_2$ in the flux is larger, in which the generation amount of fume is small but weld defects (slag inclusion) are generated. Wire No. 12 is a case where the content of $TiO_2$ in the flux is smaller, in which the amount of fume generation is small but the ability of covering the surface of bead is insufficient, to deteriorate bead appearance. Wire No. 13 is a case where the content of the oxide of alkali metal ($NaAlSi_3O_9$) is smaller, in which the amount of fume generation is small but slag removability is deteriorated. Wire No. 14 is a case where the Mg content in the flux is larger, with a result that the amount of fume generation is increased. Wire No. 15 is a case where the C content in the flux is larger, in which the amount of fume generation is significantly increased and the generation of spatter is also increased.

TABLE 5

| No. | Sheath Metal Composition (wt %) | | | | | | |
|---|---|---|---|---|---|---|---|
| | C | Si | Mn | Ti | Al | Ti/C | Al/C |
| 1 | 0.003 | 0.01 | 0.25 | 0.050 | 0.048 | 16.7 | 16.0 |
| 2 | " | " | " | " | " | " | " |
| 3 | " | " | " | " | " | " | " |
| 4 | 0.020 | " | " | 0.042 | 0.040 | 2.1 | 2.0 |
| 5 | 0.003 | " | " | 0.050 | 0.084 | 3.3 | 3.3 |
| 6 | " | " | " | " | " | " | " |
| 7 | 0.015 | 0.02 | " | 0.015 | 0.040 | 1.0 | 2.7 |
| 8 | 0.018 | " | " | 0.03 | 0.027 | 1.7 | 1.5 |
| 9 | 0.018 | " | " | 0.010 | 0.051 | 0.6 | 2.8 |
| 10 | 0.030 | " | " | 0.030 | 0.036 | 1.0 | 1.2 |
| 11 | 0.003 | 0.01 | " | 0.050 | 0.048 | 16.7 | 16.0 |
| 12 | " | " | " | " | " | " | " |
| 13 | " | " | " | " | " | " | " |
| 14 | " | " | " | " | " | " | " |
| 15 | " | " | " | " | " | " | " |

TABLE 6

| No. | Flux Composition (wt % based on total wire) | | | | | | | | | | |
|---|---|---|---|---|---|---|---|---|---|---|---|
| | $TiO_2$ | $NaAlSi_3O_8$ | $KAlSi_3O_8$ | C | Mn | Si | Mg | MgO (Mg converted value) | Fe Powder | $ZrO_2$, $Al_2O_3$ Other Oxides | Total |
| 1 | 1.00 | 1.50 | — | — | 2.40 | 0.70 | — | — | 5.60 | 3.76 | 15.0 |
| 2 | 8.50 | 0.01 | — | " | 2.50 | 0.60 | — | — | 2.85 | 0.50 | " |
| 3 | 5.50 | 0.04 | — | 0.03 | " | " | — | — | 3.33 | 3.00 | " |
| 4 | " | " | — | 0.06 | " | " | — | — | 3.30 | " | " |
| 5 | " | 0.02 | 0.02 | 0.04 | " | " | — | 0.01 | 3.31 | " | " |
| 6 | " | " | " | " | " | " | 0.09 | — | 3.23 | " | " |
| 7 | " | — | 0.04 | " | " | " | — | — | 3.32 | " | " |
| 8 | " | — | " | " | " | " | — | — | " | " | " |
| 9 | " | — | " | " | " | " | — | — | " | " | " |
| 10 | " | — | " | " | " | " | — | — | " | " | " |
| 11 | 9.00 | 0.01 | — | " | " | " | — | — | 2.35 | 0.50 | " |
| 12 | 0.50 | 1.00 | — | " | 2.40 | 0.70 | — | — | 6.60 | 3.76 | " |
| 13 | 5.00 | 1.60 | — | " | 2.50 | 0.60 | — | — | 1.76 | 3.00 | " |
| 14 | " | 0.30 | 0.30 | " | " | " | 1.10 | — | 1.66 | " | " |
| 15 | " | " | " | 0.08 | " | " | — | — | 2.73 | " | " |

TABLE 7

| Wire No. | Usability Characteristics | | | | Fume Generation Amount (mg/min) |
|---|---|---|---|---|---|
| | Bead Appearance/ Shape | Slag Removability | Amount of Spatter | Slag Inclusion at Root | |
| 1 | o | o | ⊙ | ⊙ | 470 |
| 2 | ⊙ | o | ⊙ | o | 520 |
| 3 | ⊙ | o | o | ⊙ | 480 |
| 4 | ⊙ | o | o | ⊙ | 690 |
| 5 | ⊙ | ⊙ | ⊙ | ⊙ | 525 |
| 6 | ⊙ | ⊙ | ⊙ | ⊙ | 700 |
| 7 | ⊙ | o | ⊙ | ⊙ | 695 |
| 8 | ⊙ | o | ⊙ | ⊙ | 695 |
| 9 | ⊙ | o | ⊙ | ⊙ | 815 |
| 10 | ⊙ | o | ⊙ | ⊙ | 900 |
| 11 | ⊙ | o | o | x | 530 |
| 12 | Δ | o | ⊙ | ⊙ | 480 |
| 13 | ⊙ | Δ | ⊙ | ⊙ | 515 |
| 14 | ⊙ | ⊙ | Δ | ⊙ | 860 |
| 15 | ⊙ | o | Δ | ⊙ | 780 |

(Note) Evaluation of usability characteristics: ⊙ (very good), o (good), Δ (slightly poor), x (poor)

EXAMPLE 3

This example is performed to examine the effect of reducing the fume mainly by adjustment of the metal based flux composition.

Flux-cored wires (diameter: 1.2 mm) having a sectional shape shown in (A) of FIG. 10 were fabricated, using steel sheaths having the chemical compositions shown in Table 8, in which fluxes having the composition shown in Table 9 were filled. Next, each flux-cored wire was used for performing a welding test under the following conditions for examining the amount of fume generation and the usability characteristics.

(Welding Condition)
Polarity: DCEP (wire: plus)
Welding current: 300 A
Welding voltage: suitable (arc extension: 1.5 mm from surface of base material)
Welding rate: 30 cm/min
Shield gas: 100% $CO_2$ (flow rate: 25 l/min)
Distance between tip and base metal: 25 mm
Test plate: JIS G3106, SM490A (thickness: 12 mm)
Welding process: downward bead-on plate welding
(Measurement for Fume)

In accordance with JIS Z 3930 "Method of Measuring Total Fume Amount of Covered Electrode", the value per time (g/min) (average value, repeated number: 3) was obtained by measuring the weight of fume generated during welding for 1 min. The fume was collected by an apparatus provided with a collecting box shown in FIG. 3.

(Usability Characteristics)
This was evaluated by sensory analysis.
From the results shown in Table 10, the following considerations were made.

Wire Nos. 1 to 7 are cases where the flux compositions are suitably adjusted, in which the amount of fume generation is extremely reduced (about one-half that of the conventional wire).

On the contrary, Wire Nos. 8 to 19 are cases where the metal based flux compositions are not suitably adjusted.

Concretely, Wire Nos. 17 and 18 are cases where three requirements for reducing welding fume (the contents of C, Ti and Cs and/or Rb) are not satisfied, in which the generation amount of fume is extremely increased. Wire No. 8 is a case where the C content is not suitable, with a result that the amount of fume generation is increased. Wire Nos. 9 and 10 are cases where the Ti content is not suitable. In these cases, when the Ti content is smaller, the amount of fume generation is increased, while when it is larger, there occurs a problem in terms of cracking resistance. Wire Nos. 11 and 12 are cases where the contents of Cs and/or Rb are not suitable. In these cases, when the content of Cs and/or Rb is smaller, the amount of fume generation is increased, while when it is larger, the hygroscopicity of the wire is deteriorated, to lower blowhole resistance and cracking resistance. Wire Nos. 13 and 14 are cases where the flux ratio is not suitable. In these cases, when the flux ratio is smaller, spatter of large grain is increased, while when it is larger, feedability is deteriorated. Wire Nos. 15 and 19 are cases where the content of Fe powder is not suitable. In these cases, when the content of Fe powder is smaller, the efficiency is deteriorated, while when it is large, the other components (deoxidizing agent, etc.) are insufficient, to generate weld defects such as pit and blowhole. Wire No. 17 is a case where the content of $[\{C/(Cs+Rb)\}+Ti]$ is not suitable, in which the penetration depth is insufficient, tending to generate defects in groove welding.

TABLE 8

| Symbol | Sheath Metal (Steel) Composition (wt %) | | | | | |
|---|---|---|---|---|---|---|
| | C | Si | Mn | Al | Ti | Ti/C |
| A | 0.02 | <0.01 | 0.25 | 0.03 | 0.01 | 0.5 |
| B | 0.005 | <0.01 | 0.25 | 0.03 | 0.05 | 10 |

TABLE 9

| | Sample Wire | | | | | | | | | | | | | | Sheath |
|---|---|---|---|---|---|---|---|---|---|---|---|---|---|---|---|
| | Flux Composition (wt %) | | | | | | | | | | | | | | Metal |
| No. | C | Mn | Si | Al | Ti | $Cs_2SiO_2$ | $Cs_2CO_3$ | $Rb_2CO_3$ | $TiO_2$ | $Na_2SiO_3$ | $SiO_2$ | Fe Powder | Equation (1) | Flux Ratio (%) | Symbol |
| 1 | 0.2 | 12 | 6 | 0.5 | 2 | — | 0.1 | — | 2 | 1 | 0.5 | 75.6 | 5.7 | 20 | A |
| 2 | " | " | " | " | " | — | " | — | " | " | " | " | " | " | B |
| 3 | " | " | " | " | " | 0.1 | — | 0.1 | " | 2 | 1 | 74.3 | 4.5 | " | A |
| 4 | 0.1 | 15 | 10 | 2 | 1 | — | 0.2 | — | 3 | " | 1 | 65.7 | 3.4 | " | " |
| 5 | 0.4 | " | " | 1 | 3 | 0.3 | — | — | 1 | " | " | 66.3 | 5.2 | 15 | " |
| 6 | 0.3 | " | " | 2 | 0.5 | — | 0.05 | — | " | " | " | 68.15 | 8.5 | " | " |
| 7 | " | " | " | " | " | — | " | — | " | " | " | " | " | " | B |
| 8 | 0.6 | 12 | 6 | 0.5 | 2 | — | 0.1 | — | 2 | 1 | 0.5 | 75.3 | 10.6 | 20 | A |
| 9 | 0.2 | " | " | " | 0.2 | — | " | — | " | " | " | 77.4 | 3.9 | " | " |
| 10 | " | " | " | " | 3.3 | — | " | — | " | " | " | 74.3 | 7.0 | " | " |
| 11 | " | " | " | " | 2 | — | 0.01 | — | " | " | " | 75.69 | 27.9 | " | " |
| 12 | " | " | " | " | " | — | 0.33 | — | " | " | " | 75.37 | 3.9 | " | " |
| 13 | " | " | " | " | " | — | 0.1 | — | " | " | " | 75.6 | 5.7 | 8 | " |
| 14 | " | " | " | " | " | — | " | — | " | " | " | " | " | 32 | " |
| 15 | " | 15 | 10 | 2 | 2 | — | " | — | 5 | 5 | 2.2 | 58.5 | 6.2 | 20 | " |
| 16 | 0.1 | 12 | 6 | 0.5 | 0.5 | — | 0.2 | — | 2 | 1 | 0.5 | 77.2 | 2.3 | " | " |
| 17 | 0.6 | " | " | " | 0.2 | — | 0.01 | — | " | " | " | 77.19 | 75.3 | " | " |
| 18 | " | " | " | " | " | — | " | — | " | " | " | " | " | " | B |
| 19 | 0.2 | 5 | 3 | 0.2 | 0.5 | — | 0.1 | — | " | " | " | 87.5 | 4.2 | " | A |

(Note) Equation (1) = $\{C/(Cs + Rb)\} + Ti$

TABLE 10

| No. | Fume Generation Amount (mg/min) | Others Item | Determination |
|---|---|---|---|
| 1 | 350 | — | — |
| 2 | 320 | — | — |
| 3 | 310 | — | — |
| 4 | 300 | — | — |
| 5 | 368 | — | — |
| 6 | 360 | — | — |
| 7 | 340 | — | — |
| 8 | 510 | — | — |
| 9 | 450 | — | — |
| 10 | 335 | Cracking Resistance | Δ |
| 11 | 472 | — | — |
| 12 | 306 | Moisture Absorption Resistance | x |
| 13 | 330 | Spatter | Δ |
| 14 | 355 | Feedability | x |
| 15 | 321 | Efficiency | Δ |
| 16 | 336 | Penetration | Δ |
| 17 | 810 | — | — |
| 18 | 783 | — | — |
| 19 | 347 | Quality in X-ray Inspection | x |

EXAMPLE 4

This example is performed to examine the effect of reducing the fume mainly by adjustment of the titania based flux composition.

Flux-cored wires (diameter: 1.2 mm) were fabricated, using steel sheaths having the chemical compositions shown in Table 11, in which fluxes having the compositions shown in Table 11 were filled at a specified flux ratio. Next, each flux-cored wire was used for performing a welding test under the following conditions for examining the amount of fume generation and the usability characteristics.

(Welding Condition)
Polarity: DCEP (wire: plus)
Welding current: 300 A
Arc voltage: suitable voltage to obtain arc extension of 1.5 to 2.0 mm
Welding rate: 30 cm/min
Wire extension: 25 mm
Shield gas: 100% $CO_2$ (flow rate: 25 l/min)
Test plate: JIS G3106, SM490A (thickness: 12 mm)
Welding process: downward bead-on plate welding
   (Measurement for Fume)

In accordance with JIS Z 3930 "Method of Measuring Total Fume Amount of Covered Electrode", the value per time (g/min) (average value, repeated number: 3) was obtained by measuring the weight of fume generated during welding for 1 min. The fume was collected by an apparatus provided with a collecting box shown in FIG. 3.

(Usability Characteristics)

This was evaluated by sensory analysis.

From the results shown in Table 1, the following considerations were made.

Wire Nos. 2 to 5, 8 to 10, 15 and 16, 19 and 20 are cases where the titania based flux compositions are suitably adjusted, in which the amount of fume generation is significantly reduced and the usability characteristics (generation amount of spatter, bead sag, quality in X-ray inspection, bead appearance, etc.) are excellent.

On the contrary, the other wires are cases where the flux compositions are not suitable, in which the amount of fume generation is increased, and the usability characteristics are poor in some wires.

In addition, Wire Nos. 1 to 6 are made to examine the effect of the content of Ti in the flux; Wire Nos. 7 to 11 are for the effect of the Cs content in the flux; Wire Nos. 12 and 13 are for the effect of the C content in the flux; Wire Nos. 14 to 17 are for the effect of the content of $TiO_2$ in the flux; Wire Nos. 18 to 21 are for the effect of the flux ratio; and Wire Nos. 22 and 23 are for the effect of the contents of C and Ti in the steel sheath.

TABLE 11

| Wire No. | Flux Composition (wt % based on total flux) | | | | Flux Ratio (%) | Hoop Composition (wt % based on total sheath) | | Usability Characteristics | | | | Fume Generation Amount (mg/min) |
|---|---|---|---|---|---|---|---|---|---|---|---|---|
| | $TiO_2$ | Cs | C | $TiO_2$/Cs | | C | Ti | Spatter Generation Amount | Bead Sag | Quality in X-ray Inspection | Bead Appearance/ Shape | |
| 1 | 6 | 0.3 | 0.2 | 23 | 10 | 0.01 | 0.05 | Δ | x | ◉ | Δ | 700 |
| 2 | 8 | 0.4 | 0.1 | 20 | 15 | 0.02 | 0.03 | o | o | ◉ | o | 600 |
| 3 | 10 | 0.05 | 0.3 | 200 | 20 | 0.01 | 0.10 | o | o | ◉ | o | 580 |
| 4 | 40 | 0.05 | 0.2 | 800 | 20 | tr | tr | ◉ | ◉ | ◉ | ◉ | 470 |
| 5 | 57 | 0.8 | 0.5 | 71 | 8 | 0.02 | tr | ◉ | ◉ | o | o | 530 |
| 6 | 62 | 0.08 | 0.3 | 775 | 25 | 0.01 | 0.13 | o | ◉ | Δ | Δ | 740 |
| 7 | 20 | 0.008 | 0.4 | 2500 | 15 | 0.01 | tr | o | o | o | o | 920 |
| 8 | 10 | 0.013 | 0.2 | 769 | 18 | 0.01 | 0.15 | o | o | ◉ | o | 630 |
| 9 | 30 | 0.6 | 0.05 | 50 | 20 | 0.02 | 0.03 | ◉ | ◉ | ◉ | ◉ | 480 |
| 10 | 50 | 0.9 | 0.03 | 56 | 10 | 0.01 | 0.17 | ◉ | o | o | o | 500 |
| 11 | 40 | 1.2 | 0.3 | 33 | 23 | 0.01 | 0.01 | Δ–x | Δ | o | o | 450 |
| 12 | 30 | 0.04 | 0.6 | 750 | 9 | 0.1 | 0.06 | Δ–x | o | o | Δ | 740 |
| 13 | 55 | 0.5 | 0.9 | 110 | 27 | 0.04 | 0.05 | x | o | o | Δ | 880 |
| 14 | 17 | 0.94 | 0.1 | 18 | 15 | 0.01 | tr | Δ | Δ | Δ | Δ | 820 |
| 15 | 20 | 0.95 | 0.4 | 21 | 12 | 0.01 | 0.03 | o | o | o | o | 520 |
| 16 | 59 | 0.03 | 0.2 | 1967 | 25 | 0.01 | tr | o | ◉ | o | o | 680 |
| 17 | 41 | 0.02 | 0.2 | 2050 | 17 | 0.02 | 0.08 | o | o | o | o | 780 |
| 18 | 40 | 0.5 | 0.1 | 80 | 3 | 0.01 | tr | Δ | Δ | o | Δ | 750 |
| 19 | 47 | 0.7 | 0.2 | 67 | 6 | 0.005 | 0.04 | o | o | o | o | 580 |
| 20 | 12 | 0.05 | 0.3 | 240 | 29 | 0.01 | tr | o | o | o | o | 540 |
| 21 | 23 | 0.4 | 0.4 | 58 | 32 | 0.01 | 0.05 | o | o | Δ | Δ | 620 |

TABLE 11-continued

| Wire No. | Flux Composition (wt % based on total flux) | | | | Flux Ratio (%) | Hoop Composition (wt % based on total sheath) | | Usability Characteristics | | | | Fume Generation Amount (mg/min) |
|---|---|---|---|---|---|---|---|---|---|---|---|---|
| | TiO$_2$ | Cs | C | TiO$_2$/Cs | | C | Ti | Spatter Generation Amount | Bead Sag | Quality in X-ray Inspection | Bead Appearance/ Shape | |
| 22 | 30 | 0.05 | 0.1 | 600 | 20 | 0.03 | tr | Δ | o | o | o | 740 |
| 23 | 38 | 0.1 | 0.05 | 760 | 15 | 0.01 | 0.22 | — | — | — | — | — |

(Note 1) Evaluation: x (poor), Δ (slightly poor), o (good), ⊙ (very good)
(Note 2) No. 21 was high in the frequency of breakage, and No. 23 was difficult to be drawn.

EXAMPLE 5

This example is performed to examine the effect of reducing the fume mainly by adjustment of the sheath metal composition and the metal based flux composition.

Flux-cored wires (diameter: 1.4 mm) having a sectional shape shown in (A) of FIG. 10 were fabricated, using steel sheaths having the chemical compositions shown in Table 12, in which fluxes having the composition shown in Table 13 were filled. Next, each flux-cored wire was used for performing a welding test under the following conditions for examining the amount of fume generation and the usability characteristics.

(Welding Condition)
Polarity: DCEP (wire: plus)
Welding current: 350 A
Welding voltage: 37±3 V
Welding rate: 30 cm/min
Shield gas: 100% $CO_2$ (flow rate: 25 l/min)
Distance between tip and base metal: 25 mm
Test plate: JIS G3106, SM490A (thickness: 12 mm)
Welding process: downward bead-on plate welding (Measurement for Fume)

In accordance with JIS Z 3930 "Method of Measuring Total Fume Amount of Covered Electrode", the value per time (g/min) (average value, repeated number: 3) was obtained by measuring the weight of fume generated during welding for 1 min. The fume was collected by an apparatus provided with a collecting box shown in FIG. 3.

(Usability Characteristics)

This was evaluated by sensory analysis.

From the results shown in Table 14, the following considerations were made.

Wire Nos. 2, 3, 6, 7, 15 and 18 are cases where the sheath compositions and the flux compositions are suitably adjusted, in which the amount of fume generation is significantly reduced.

On the contrary, the other wires are case where either of the sheath composition and the flux composition is not suitable, in which the amount of fume generation is increased, or if it is not reduced, the other performances such as the usability characteristics are deteriorated.

Concretely, Wire Nos. 1 and 4 are cases where the contents of Cs and Rb are not suitable. In these cases, when the contents of Cs and Rb are smaller, the amount of fume generation is increased, while when they are larger, the hygroscopicity of the wire is deteriorated, to lower blowhole resistance and the cracking resistance. Wire Nos. 5 and 8 are cases where the contents of alkali metals are not suitable. In these cases, when the contents of alkali metals are smaller, arc stability is deteriorated, to increase the generation amount of spatter, while when they are larger, the amount of spatter generation is rather increased and also the effect of reducing the amount of fume generation is harmed.

Wire Nos. 9 and 10 are cases where the content of Fe powder is not suitable. In these cases, when the content of Fe powder is smaller, the welding efficiency is lowered and the amount of spatter generation is increased, while when it is larger, it is difficult to secure the mechanical properties of weld and to prevent weld defects such as pit and blowhole. Wire Nos. 11 and 12 are cases where the Mn content is not suitable. In these cases, when the Mn content is smaller, sufficient strength is not obtained and bead shape is deteriorated, while when it is larger, strength is excessively increased, tending to generate low temperature cracking. Wire Nos. 13 and 14 are cases where the Si content is not suitable. In these cases, when the Si content is smaller, bead shape is deteriorated, while when it is larger, the toughness and ductility of weld are lowered.

Wire No. 16 is a case where the C content in the sheath is not suitable, in which the amount of fume generation is increased. Wire Nos. 17 and 21 are cases where the Al content in the sheath is not suitable. In these cases, when the Al content is smaller, the amount of fume generation is increased, while when it is larger, the ductility of weld is lowered. Wire Nos. 19 and 20 are cases where the Ti amount in the sheath is not suitable. In these cases, when the Ti amount is smaller, the amount of fume generation is increased, while when it is larger, the yield of Ti in weld is increased, to lower the toughness.

TABLE 12

| | Sheath Metal Composition (wt %) | | | | | | |
|---|---|---|---|---|---|---|---|
| No. | C | Si | Mn | Ti | Al | Ti/C | Al/C |
| 1 | 0.005 | 0.02 | 0.25 | 0.06 | 0.04 | 12.0 | 8.0 |
| 2 | 0.018 | " | " | 0.02 | " | 1.1 | 2.2 |
| 3 | 0.015 | " | " | 0.06 | " | 2.4 | 1.8 |
| 4 | 0.005 | " | 0.30 | 0.06 | 0.007 | 12.0 | 1.4 |
| 5 | 0.007 | " | 0.20 | 0.05 | 0.012 | 7.1 | 1.7 |
| 6 | 0.009 | 0.01 | 0.32 | 0.008 | 0.03 | 0.9 | 3.3 |
| 7 | 0.010 | " | 0.21 | 0.23 | 0.04 | 23.0 | 4.0 |
| 8 | 0.006 | " | 0.18 | 0.03 | 0.13 | 5.0 | 21.7 |
| 9 | 0.003 | " | 0.25 | 0.05 | 0.04 | 16.7 | 13.3 |
| 10 | 0.030 | " | " | " | " | 1.7 | 1.3 |

TABLE 13

| No. | Flux Composition (wt % based on total flux, alkali metal converted value) | | | | | | Metal Powder Ratio (%) (to flux) | Wire Composition (wt %) | | Sheath Metal Symbols (corresponding to sample Nos. in Table 1) |
|---|---|---|---|---|---|---|---|---|---|---|
| | CsSiO$_2$ | CsCO$_3$ | RbCO$_3$ | Na$_2$SiO$_3$ | K$_2$SiO$_3$ | Fe Powder | | Mn | Si | |
| 1 | 0.0005 | — | — | 0.02 | 0.05 | 20 | 95 | 1.3 | 0.5 | No. 1 |
| 2 | 0.0015 | — | — | 0.10 | — | 15 | 97 | 1.0 | 1.0 | " |
| 3 | — | 0.09 | — | 0.20 | — | 25 | 96 | 0.7 | 1.5 | " |
| 4 | 0.11 | — | — | 0.50 | — | 20 | 97 | 3.0 | 0.7 | " |
| 5 | 0.01 | — | — | 0.008 | — | 16 | 96 | 2.5 | 1.5 | " |
| 6 | — | 0.01 | — | 0.013 | — | 17 | 98 | 0.6 | 1.2 | No. 2 |
| 7 | — | — | 0.02 | — | 0.27 | 7 | 95 | 1.8 | 0.9 | No. 1 |
| 8 | — | 0.05 | — | 0.32 | — | 8 | 97 | 2.0 | 0.9 | " |
| 9 | — | — | 0.08 | 0.20 | — | 4 | 92 | 1.5 | 0.8 | " |
| 10 | 0.08 | — | — | — | 0.04 | 30 | 99 | 0.8 | 0.4 | " |
| 11 | — | 0.09 | — | 0.15 | — | 18 | 96 | 0.4 | 1.0 | " |
| 12 | — | 0.08 | — | — | 0.08 | 16 | 97 | 3.8 | 0.5 | " |
| 13 | — | — | 0.08 | — | 0.25 | 15 | 97 | 2.5 | 0.08 | " |
| 14 | — | 0.05 | — | 0.08 | — | 14 | 96 | 2.0 | 2.0 | " |
| 15 | 0.07 | — | — | 0.16 | — | 17 | 97 | 1.8 | 1.0 | " |
| 16 | " | " | " | " | " | " | 96 | 1.7 | 0.8 | No. 3 |
| 17 | " | " | " | " | " | " | 95 | 2.0 | 1.1 | No. 4 |
| 18 | 0.07 | — | — | 0.06 | — | 17 | 97 | 1.5 | 1.0 | No. 5 |
| 19 | " | " | " | " | " | " | 98 | 1.9 | 0.9 | No. 6 |
| 20 | " | " | " | " | " | " | 98 | 1.6 | 1.0 | No. 7 |
| 21 | " | " | " | " | " | " | 96 | 1.3 | 0.9 | No. 8 |

TABLE 14

| No. | Fume Generation Amount (mg/min) | Usability Characteristics, Efficiency, Welding Performance or the like | |
|---|---|---|---|
| | | Item | Determination |
| 1 | 820 | — | — |
| 2 | 503 | — | — |
| 3 | 450 | — | — |
| 4 | 400 | Moisture Absorption Resistance | x |
| 5 | 600 | Arc Stability, Spatter | Δ–x |
| 6 | 430 | — | — |
| 7 | 460 | — | — |
| 8 | 840 | Arc Stability, Spatter | x |
| 9 | 500 | Efficiency, Spatter | Δ–x |
| 10 | 480 | Strength, Pit, Blowhole | Δ–x |
| 11 | 510 | Strength, Bead Shape | x |
| 12 | 450 | Strength, Cracking | x |
| 13 | 440 | Bead Shape | x |
| 14 | 470 | Toughness, Ductility | x |
| 15 | 400 | — | — |
| 16 | 950 | — | — |
| 17 | 900 | — | — |
| 18 | 370 | — | — |
| 19 | 900 | — | — |
| 20 | 480 | Ductility | x |
| 21 | 450 | Ductility | x |

EXAMPLE 6

This example is performed to examine the effect of reducing the fume mainly by adjustment of the sheath metal composition and the titania based flux composition.

Flux-cored wires (diameter: 1.2 mm) were fabricated, using steel sheaths having the chemical compositions shown in Table 5, in which fluxes having the compositions shown in Table 15 were filled at a specified flux ratio. Next, each flux-cored wire was used for performing a welding test under the following conditions.

(Welding Condition)
Polarity: DCEP (wire: plus)
Welding current: 300 A
Arc voltage: suitable voltage to obtain arc extension of 1.5 to 2.0 mm
Welding rate: 30 cm/min
Wire extension: 25 mm
Shield gas: 100% $CO_2$ (flow rate: 25 l/min)
Test plate: JIS G3106, SM490A (thickness: 12 mm)
Welding process: downward bead-on plate welding (Measurement for Fume)

In accordance with JIS Z 3930 "Method of Measuring Total Fume Amount of Covered Electrode", the value per time (g/min) (average value, repeated number: 3) was obtained by measuring the weight of fume generated during welding for 1 min. The fume was collected by an apparatus provided with a collecting box shown in FIG. 3.

(Usability Characteristics)

This was evaluated by sensory analysis.

From the results shown in Table 16, the following considerations were made.

Wire Nos. 2, 3, 6, 7, 10, 11, 17, 18, 21 and 22 are cases where the mild steel sheath compositions and the titania based flux compositions are suitably adjusted, in which the amount of fume generation is significantly reduced, and further the usability characteristics (bead appearance/shape, bead sag, generation amount of spatter, slag removability, quality in X-ray inspection) are excellent.

On the contrary, the other wires are cases where the flux compositions are not suitable, in which the generation amount of fume generation is increased, and the usability characteristics are poor.

In addition, Wires Nos. 1 to 14 are made to examine the effect of the content of $TiO_2$; Wire Nos. 5 to 8 are for the effect of the contents of oxides of alkali metals in the flux; Wire Nos. 9 to 12 are for the effect of the Cs content and the $TiO_2$/Cs ratio in the flux; Wire Nos. 14, and 16 to 19 are for the effect of the Mn content in the flux; and Wire Nos. 20 to 23 are for the effect of the Si content in the flux.

TABLE 15

| No. | Flux Composition (wt % based on total wire) | | | | | | | | | Steel Sheath Used (corresponding to Nos. in Table 5) |
|---|---|---|---|---|---|---|---|---|---|---|
| | TiO$_2$ | Alkali Metal Oxides excluding Cs (metal element converted value) | Cs | TiO$_2$/Cs | C | Mg | MgO (Mg converted value) | Wire Composition Mn | Si | |
| 1  | 0.80 | 0.83  | 0.01   | 80   | 0.03  | 0.3   | 0.2 | 2.5 | 1.0  | No. 1  |
| 2  | 1.10 | 0.70  | 0.005  | 220  | 0.01  | —     | 0.1 | 2.2 | 1.3  | No. 4  |
| 3  | 8.30 | 0.03  | 0.04   | 208  | 0.02  | 0.05  | 0.2 | 3.0 | 0.5  | No. 5  |
| 4  | 9.00 | 1.20  | 0.006  | 1500 | 0.004 | —     | —   | 1.8 | 0.4  | No. 7  |
| 5  | 4.30 | 0.007 | 0.01   | 430  | 0.01  | 0.8   | —   | 1.2 | 0.2  | No. 8  |
| 6  | 2.40 | 0.012 | 0.002  | 1200 | 0.02  | 0.03  | 0.6 | 2.8 | 1.0  | No. 1  |
| 7  | 7.00 | 1.42  | 0.15   | 47   | 0.007 | —     | —   | 1.8 | 0.4  | No. 11 |
| 8  | 3.60 | 1.70  | 0.1    | 36   | 0.04  | —     | 0.4 | 1.6 | 0.7  | No. 1  |
| 9  | 1.00 | 0.8   | 0.0004 | 2500 | 0.02  | —     | 0.3 | 2.1 | 0.7  | No. 4  |
| 10 | 1.45 | 0.5   | 0.0007 | 2071 | 0.01  | 0.9   | —   | 1.5 | 0.7  | No. 5  |
| 11 | 5.80 | 0.2   | 0.28   | 21   | 0.05  | —     | —   | 3.0 | 0.2  | No. 7  |
| 12 | 6.30 | 0.7   | 0.33   | 19   | 0.005 | 0.6   | —   | 2.4 | 1.2  | No. 8  |
| 13 | 4.80 | 0.05  | 0.015  | 320  | 0.07  | 0.9   | —   | 2.2 | 0.5  | No. 1  |
| 14 | 5.50 | 0.75  | 0.1    | 55   | 0.04  | 0.005 | —   | 1.6 | 0.3  | No. 11 |
| 15 | 3.50 | 1.20  | 0.04   | 88   | 0.02  | 0.5   | 0.7 | 3.1 | 0.4  | No. 1  |
| 16 | 3.70 | 0.09  | 0.15   | 25   | 0.05  | 0.3   | 0.1 | 0.4 | 0.7  | No. 4  |
| 17 | 7.60 | 0.95  | 0.005  | 1520 | 0.01  | —     | —   | 0.6 | 0.5  | No. 5  |
| 18 | 2.70 | 0.50  | 0.01   | 270  | 0.02  | —     | 0.3 | 3.5 | 0.2  | No. 7  |
| 19 | 6.50 | 1.00  | 0.02   | 325  | 0.03  | 0.1   | 0.2 | 3.7 | 0.8  | No. 8  |
| 20 | 5.00 | 0.8   | 0.04   | 125  | 0.02  | 0.4   | —   | 2.0 | 0.08 | No. 1  |
| 21 | 5.50 | 0.7   | 0.10   | 55   | 0.04  | 0.2   | —   | 1.5 | 0.13 | No. 11 |
| 22 | 4.00 | 0.3   | 0.02   | 200  | 0.008 | —     | —   | 2.2 | 1.40 | No. 1  |
| 23 | 6.00 | 0.5   | 0.004  | 1500 | 0.01  | —     | —   | 1.4 | 1.54 | No. 4  |

TABLE 16

| Wire No. | Usability Characteristics | | | | | Fume Generation Amount (mg/min) |
|---|---|---|---|---|---|---|
| | Bead Appearance/ Shape | Bead Sag | Spatter Generation Amount | Slag Removability | Quality in X-ray Inspection | |
| 1  | Δ–x | Δ–x | Δ   | Δ   | o   | 650 |
| 2  | o   | o   | o   | o   | ⊙   | 550 |
| 3  | o   | ⊙   | ⊙   | ⊙   | o   | 580 |
| 4  | Δ   | o   | Δ   | o   | Δ–x | 730 |
| 5  | Δ   | o   | Δ–x | o   | o   | 850 |
| 6  | o   | o   | o   | o   | o   | 650 |
| 7  | o   | o   | ⊙   | o   | o   | 500 |
| 8  | Δ   | Δ   | o   | Δ–x | Δ   | 880 |
| 9  | Δ   | Δ   | Δ   | o   | o   | 890 |
| 10 | o   | o   | ⊙   | o   | o   | 540 |
| 11 | o   | o   | o   | o   | o   | 470 |
| 12 | Δ   | Δ   | Δ–x | o   | Δ–x | 910 |
| 13 | o   | o   | Δ–x | Δ   | o   | 920 |
| 14 | o   | o   | o   | o   | o   | 630 |
| 15 | o   | o   | o   | o   | o   | 650 |
| 16 | Δ   | Δ   | o   | o   | Δ   | 700 |
| 17 | o   | o   | o   | o   | o   | 610 |
| 18 | ⊙   | o   | o   | o   | o   | 500 |
| 19 | Δ   | o   | Δ   | o   | Δ   | 780 |
| 20 | Δ   | Δ   | o   | o   | Δ   | 720 |
| 21 | o   | o   | o   | o   | o   | 480 |
| 22 | ⊙   | o   | o   | o   | o   | 520 |
| 23 | Δ   | o   | Δ   | o   | Δ   | 740 |

(Note) Evaluation of usability characteristics: ⊙ (very good), o (good), Δ (slightly poor), x (poor)

What is claimed is:

1. A flux-cored wire for gas shield arc welding comprising a mild steel sheath and a flux composition filled in said mild steel sheath, wherein said mild steel sheath is made of a mild steel containing, based on the total weight of said sheath, 0.02% or less of C, 0.01 to 0.20% of Ti, and 0.01 to 0.15% of Al, the contents of Ti and C satisfying a relation of Ti/C≧1.0 and the contents of Al and C satisfying a relation of Al/C≧1.5; and said flux composition contains, based on the weight of the total wire, 0.50 to 3.60% of Mn, including the Mn amount in the sheath, and 0.10 to 1.80% of Si, including the Si amount in the sheath.

2. A flux-cored wire for gas shield arc welding according to claim 1, wherein said mild steel sheath is made of a mold steel containing, based on the total weight of said sheath, 0.01% or less of C, 0.01 to 0.10% of Ti, and 0.01 to 0.05% of Al, the contents of Ti and C satisfying a relation of Ti/C$\geq$3.0 and the contents of Al and C satisfying a relation of Al/C$\geq$2.0.

3. A flux-cored wire for gas shield arc welding according to claim 2, wherein said flux composition contains, based on the total weight of said wire, 0.0005 to 0.3%, as Cs or Rb converted value or both, of the total of one or more compounds of Cs, Rb or both.

4. A metal based flux-cored wire for gas shield arc welding according to claim 2, wherein said flux composition comprises a metal based flux composition containing, based on the total weight of said wire, 0.3 to 1.0% of Ti or Ti oxide, as Ti converted value, 0.1 to 0.15% of one or more kinds of oxides or fluorides of alkali metals as alkali metal converted value, 5 to 28% of Fe powder, and 94% or more, based on the total weight of the flux, of a metal powder; and further, 0.50 to 3.60% of Mn, including the Mn amount in the sheath, and 0.10 to 1.80% of Si, including the Si amount in the sheath.

5. A metal based flux-cored wire for gas shield arc welding according to claim 4, wherein said flux composition contains, based on the total weight of said wire, 1.0% or less of Al or $Al_2O_3$, as Al converted value.

6. A metal based flux-cored wire for gas shield arc welding according to claim 5, wherein said flux composition further contains, based on the total weight of said wire, 0.07% or less of C; and the contents of Ti and C in said flux satisfy a relation of Ti/C$\geq$1.0.

7. A metal based flux-cored wire for gas shield arc welding according to claim 6, wherein the contents of Ti and C satisfy the relation of Ti/C$\geq$3.0.

8. A metal based flux-cored wire for gas shield arc welding according to claim 4, wherein said flux composition further contains, based on the total weight of said wire, 0.07% or less of C; and the contents of Ti and C in said flux satisfy a relation of Ti/C$\geq$1.0.

9. A metal based flux-cored wire for gas shield arc welding according to claim 8, wherein the contents of Ti and C satisfy the relation of Ti/C$\geq$3.0.

10. A titania based flux-cored wire for gas shield arc welding according to claim 2, wherein said flux composition comprises a titania based flux composition containing, based on the total weight of said wire, 1.00 to 8.50% of $TiO_2$, and 0.01 to 1.50% of oxides of alkali metals as alkali metal converted value, and further 0.50 to 3.60% of Mn, including the Mn amount in the sheath, and 0.10 to 1.50% of Si, including the Si amount in the sheath.

11. A titania based flux-cored wire for gas shield arc welding according to claim 10, wherein said flux composition contains, based on the total weight of said wire, 0.01 to 1.00% of Mg, MgO or both, as Mg converted value.

12. A titania based flux-cored wire for gas shield arc welding according to claim 11 wherein said flux composition further contains, based on the total weight of said wire, 0.06% or less of C.

13. A titania based flux-cored wire for gas shield arc welding according to claim 10, wherein said flux composition further contains, based on the total weight of said wire, 0.06% or less of C.

14. A metal based flux-cored wire for gas shield arc welding according to claim 1, wherein said flux composition comprises a metal based flux composition containing, based on the total weight of said wire, 0.3 to 1.0% of Ti or Ti oxide, as Ti converted value, 0.1 to 0.15% of one or more kinds of oxides or fluorides of alkali metals as alkali metal converted value, 5 to 28% of Fe powder, and 94% or more, based on the total weight of the flux, of a metal powder; and further, 0.50 to 3.60% of Mn, including the Mn amount in the sheath, and 0.10 to 1.80% of Si, including the Si amount in the sheath.

15. A metal based flux-cored wire for gas shield arc welding according to claim 14, wherein said flux composition contains, based on the total weight of said wire, 1.0% or less of Al or $Al_2O_3$, as Al converted value.

16. A metal based flux-cored wire for gas shield arc welding according to claim 15, wherein said flux composition further contains, based on the total weight of said wire, 0.07% or less of C; and the contents of Ti and C in said flux satisfy a relation of Ti/C$\geq$1.0.

17. A metal based flux-cored wire for gas shield arc welding according to claim 16, wherein the contents of Ti and C satisfy the relation of Ti/C$\geq$3.0.

18. A metal based flux-cored wire for gas shield arc welding according to claim 14, wherein said flux composition further contains, based on the total weight of said wire, 0.07% or less of C; and the contents of Ti and C in said flux satisfy a relation of Ti/C$\geq$1.0.

19. A metal based flux-cored wire for gas shield arc welding according to claim 18 wherein the contents of Ti and C satisfy the relation of Ti/C$\geq$3.0.

20. A titania based flux-cored wire for gas shield arc welding according to claim 1, wherein said flux composition comprises a titania based flux composition containing, based on the total weight of said wire, 1.00 to 8.50% of $TiO_2$, and 0.01 to 1.50% of oxides of alkali metals as alkali metal converted value, and further 0.50 to 3.60% of Mn, including the Mn amount in the sheath, and 0.10 to 1.50% of Si, including the Si amount in the sheath.

21. A titania based flux-cored wire for gas shield arc welding according to claim 20, wherein said flux composition contains, based on the total weight of said wire, 0.01 to 1.00% of Mg, MgO or both, as Mg converted value.

22. A titania based flux-cored wire for gas shield arc welding according to claim 20, wherein said flux composition further contains, based on the total weight of said wire, 0.06% or less of C.

23. A titania based flux-cored wire for gas shield arc welding according to claim 21, wherein said flux composition further contains, based on the total weight of said wire, 0.06% or less of C.

24. A flux-cored wire for gas shield arc welding according to claim 1, wherein said flux composition contains, based on the total weight of said wire, 0.0005 to 0.3%, as Cs or Rb converted value or both, of the total of one or more compounds of Cs, Rb or both.

25. A metal based flux-cored wire for gas shield arc welding comprising a mild steel sheath and a flux composition filled in said mild steel sheath, wherein said flux composition is filled in said mild steel sheath in an amount of 10 to 30% based on the total weight of said wire; and said flux composition contains, based on the total weight of said flux, 60 to 85% of Fe powder, 0.5% or less of C, 0.5 to 3.0% of Ti, and 0.01 to 0.3%, as Cs or Rb converted value or both, of the total of one or more compounds of Cs, Rb or both, the contents of C, Cs, Rb and Ti satisfying a relation of C/(Cs+Rb)+Ti=3 or more, wherein the values of Cs, Rb or both are converted from those in compounds of Cs and Rb wherein percentage is based on the weight of the total flux.

26. A metal based flux-cored wire for gas shield arc welding according to claim 25, wherein said mild steel sheath is made of a mild steel containing 0.01% or less of C and 0.01 to 0.20% of Ti.

27. A flux-cored wire for gas shield arc welding according to claim 25, wherein said mild steel sheath is made of a mild steel containing, based on the total weight of said sheath, 0.01% or less of C, 0.01 to 0.10% of Ti, and 0.01 to 0.05% of Al, the contents of Ti and C satisfying a relation of Ti/C≧3.0 and the contents of Al and C satisfying a relation of Al/C≧2.0.

28. A titania based flux-cored wire for gas shield arc welding comprising a mild steel sheath and a flux composition filled in said mild steel sheath, wherein said flux composition is filled in said mild steel sheath in an amount of 5 to 30% based on the total weight of said wire; and said flux composition contains, based on the total weight of said flux, 8 to 60% of $TiO_2$, 0.01 to 1.0% of Cs compound as Cs converted value, and 0.5% or less of C, said ratio between $TiO_2$/compounds of Cs being in the range of from 20 to 2000.

29. A titania based flux-cored wire for gas shield arc welding according to claim 28 wherein said mild sheath is made of a mild steel containing, based on the total weight of said sheath, 0.02% or less of C and 0.20% or less of Ti.

30. A flux-cored wire for gas shield arc welding according to claim 28, wherein said mild steel sheath is made of a mild steel containing, based on the total weight of said sheath, 0.01% or less of C, 0.01 to 0.10% of Ti, and 0.01 to 0.05% of Al, the contents of Ti and C satisfying a relation of Ti/C≧3.0 and the contents of Al and C satisfying a relation of Al/C≧2.0.

31. A metal based flux-cored wire for gas shield arc welding comprising a mild steel sheath and a flux composition filled in said mild steel sheath, wherein said mild steel sheath is made of a mild steel containing, based on the total weight of said sheath, 0.02% or less of C, 0.01 to 0.20% of Ti, and 0.01 to 0.10% of Al, the contents of Ti and C satisfying a relation of Ti/C≧1.0 and the contents of Al and C satisfying a relation of Al/C≧1.5; and said flux composition contains, based on the total weight of said wire, 0.01 to 0.30%, as alkali metal converted value, of one or more kinds of oxides and fluorides of alkali metals other than Cs and Rb, 5 to 28% of Fe powder, 94% or more, based on the total weight of said flux, of metal powder, and 0.001 to 0.10%, as Cs or Rb converted value or both, of the total of one or more compounds of Cs, Rb or both, and further 0.50 to 3.60% of Mn, including the Mn amount in the sheath, and 0.10 to 1.80% of Si, including the Si content in the sheath.

32. A titania based flux-cored wire for gas shield arc welding comprising a mild steel sheath and a flux composition filled in said mild steel sheath, wherein said mild steel sheath is made of a mild steel containing, based on the total weight of said sheath, 0.02% or less of C, 0.01 to 0.20% of Ti, and 0.01 to 0.15% of Al, the contents of Ti and C satisfying a relation of Ti/C≧1.0 and the contents of Al and C satisfying a relation of Al/C≧1.5; and said flux composition contains, based on the total weight of said wire, 1.00 to 8.50% of $TiO_2$, 0.01 to 1.50%, as alkali metal converted value, of oxides of alkali metals other than Cs, 0.0005 to 0.3%, as Cs converted value, of a compound of Cs, said ratio between $TiO_2$/compounds of Cs, as Cs converted value being in the range of from 20 to 2000, 0.06% or less of C, 0.50 to 3.60% of Mn, including the Mn amount in the sheath, and 0.10 to 1.50% of Si, including the Si amount in the sheath.

33. A titania based flux-cored wire for gas shield arc welding according to claim 32, wherein said flux composition contains, based on the total weight of said wire, 0.01 to 1.00% of Mg, MgO or both, as Mg converted value.

* * * * *